(12) United States Patent
Naya et al.

(10) Patent No.: US 10,721,370 B2
(45) Date of Patent: Jul. 21, 2020

(54) INFORMATION PROCESSING APPARATUS, INFORMATION PROCESSING SYSTEM, AND METHOD OF UPDATING FILE

(71) Applicants: Wataru Naya, Kanagawa (JP); Mari Tatezono, Tokyo (JP); Naohiko Kubo, Kanagawa (JP); Zentaroh Ono, Tokyo (JP)

(72) Inventors: Wataru Naya, Kanagawa (JP); Mari Tatezono, Tokyo (JP); Naohiko Kubo, Kanagawa (JP); Zentaroh Ono, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/352,903

(22) Filed: Mar. 14, 2019

(65) Prior Publication Data
US 2019/0306362 A1     Oct. 3, 2019

(30) Foreign Application Priority Data
Mar. 27, 2018   (JP) .................. 2018-060166

(51) Int. Cl.
*H04N 1/00* (2006.01)

(52) U.S. Cl.
CPC ..... *H04N 1/00962* (2013.01); *H04N 1/00408* (2013.01); *H04N 1/00498* (2013.01); *H04N 2201/0094* (2013.01)

(58) Field of Classification Search
CPC .......... H04N 1/00962; H04N 1/00408; H04N 1/00498; H04N 2201/0094
USPC ........................................................ 358/1.15
See application file for complete search history.

(56) References Cited

U.S. PATENT DOCUMENTS

2008/0222190 A1* 9/2008 Kosaka .................. G06F 9/454
2016/0337543 A1* 11/2016 Kano ..................... G06F 9/454

FOREIGN PATENT DOCUMENTS

JP         2010-108142        5/2010

* cited by examiner

*Primary Examiner* — Saeid Ebrahimi Dehkordy
(74) *Attorney, Agent, or Firm* — Oblon, McClelland, Maier & Neustadt, L.L.P.

(57) ABSTRACT

An information processing apparatus includes a memory that stores an application and a module related to an operation of the application, and circuitry configured to detect a difference between a first character string included in a first file associated with the application and a second character string included in a second file associated with the module as difference information, the second character string corresponding to the first character string, transmit the difference information indicating the detected difference to a server, and update the second file in accordance with an update notification of the second file transmitted from the server.

7 Claims, 22 Drawing Sheets

| LANGUAGE | DESCRIPTION EXAMPLE (xml file) |
|---|---|
| JAPANESE | <string name="app_name">アプリ</string> |
| ENGLISH | <string name="app_name">app</string> |

| LANGUAGE | DESCRIPTION EXAMPLE (xml file) |
|---|---|
| GERMAN | <string name="app_name">anwendung</string> |

| LANGUAGE | DESCRIPTION EXAMPLE (xml file) |
|---|---|
| JAPANESE | <string name="app_name">アプリ</string> |
| FRENCH | <string name="app_name">app</string> |
| ITALIAN | <string name="app_name">applicazione</string> |

FIG. 6

TERM ID MANAGEMENT TABLE 210

| TERM ID | APPLICATION NAME | TERM IDENTIFICATION INFORMATION OF APPLICATION | TERMINOLOGY MODULE NAME | TERM IDENTIFICATION INFORMATION OF TERMINOLOGY MODULE |
|---|---|---|---|---|
| app_name | APPLICATION 30a | 0x0001 | TERMINOLOGY MODULE 40a | 0x1002 |
| app_name | APPLICATION 30a | 0x0001 | TERMINOLOGY MODULE 40b | 0x2003 |
| app_scan | APPLICATION 30a | 0x0002 | TERMINOLOGY MODULE 40a | 0x1003 |
| app_copy | APPLICATION 30a | 0x0003 | TERMINOLOGY MODULE 40a | 0x1004 |
| app_fax | APPLICATION 30a | 0x0004 | TERMINOLOGY MODULE 40a | 0x1005 |
| ... | ... | ... | ... | ... |

FIG. 7

PRIORITY MANAGEMENT TABLE 220

| APPLICATION NAME | TERMINOLOGY MODULE NAME | PRIORITY LEVEL |
|---|---|---|
| APPLICATION 30a | TERMINOLOGY MODULE 40a | 1 |
|  | TERMINOLOGY MODULE 40b | 2 |
|  | APPLICATION 30a | 3 |
| APPLICATION 30b | TERMINOLOGY MODULE 40c | 1 |
|  | APPLICATION 30b | 2 |
| ... | ... | ... |

FIG. 8

NOTIFICATION HISTORY MANAGEMENT TABLE 510

| TERMINOLOGY MODULE NAME | TERMINOLOGY MODULE VERSION | APPLICATION NAME | APPLICATION VERSION | NOTIFICATION HISTORY INFORMATION ||
|---|---|---|---|---|---|
| | | | | LAST NOTIFICATION DATE | THE NUMBER OF TIMES TRANSMITTING NOTIFICATION INFORMATION TO CREATION SOURCE |
| TERMINOLOGY MODULE 40a | 1.0 | APPLICATION 30a | 1.5 | 2017/1/14 15:19 | 12 |
| TERMINOLOGY MODULE 40a | 1.1 | APPLICATION 30a | 1.2 | 2017/2/24 09:45 | 3 |
| TERMINOLOGY MODULE 40b | 1.0 | APPLICATION 30a | 1.2 | 2017/1/31 11:25 | 1 |
| ... | | ... | ... | ... | ... |

FIG. 9

NOTIFICATION DESTINATION MANAGEMENT TABLE 520

| TERMINOLOGY MODULE NAME | TERMINOLOGY MODULE VERSION | ADDRESS INFORMATION |
|---|---|---|
| TERMINOLOGY MODULE 40a | 1.0 | xxx@aaa.co.jp |
| TERMINOLOGY MODULE 40a | 1.1 | xxx@aaa.co.jp |
| TERMINOLOGY MODULE 40b | 1.0 | yyy@bbb.co.jp |
| ... | ... | ... |

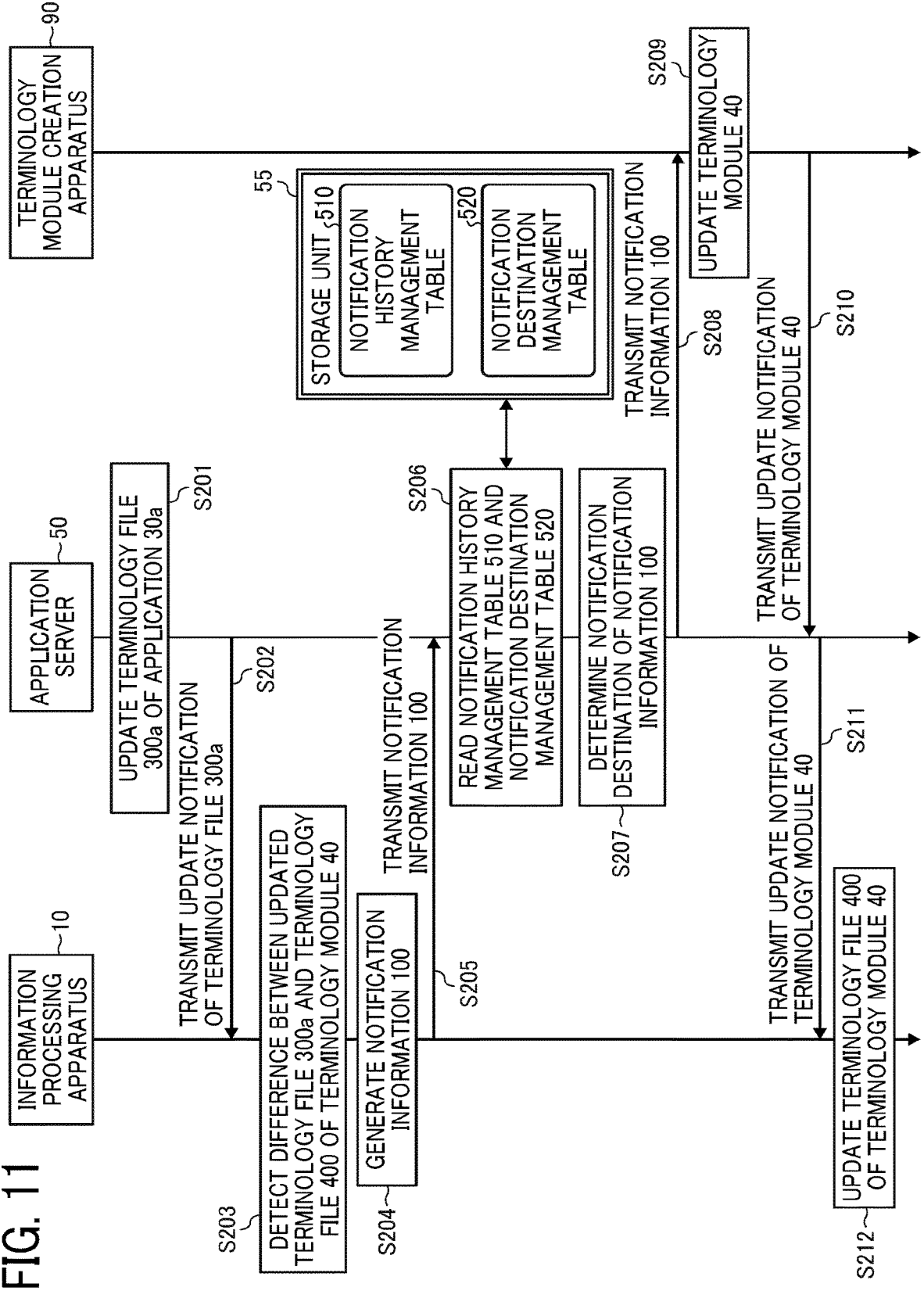

FIG. 12A

| LANGUAGE | DESCRIPTION EXAMPLE (xml file) |
|---|---|
| JAPANESE | <string name="app_name">アプリ</string> |
| ENGLISH | <string name="app_name">app</string> |

| LANGUAGE | DESCRIPTION EXAMPLE (xml file) |
|---|---|
| JAPANESE | <string name="app_name">アプリ</string> |
| | <string name="app_scan">スキャン</string> |
| | <string name="app_copy">コピー</string> |
| | <string name="app_fax">ファックス</string> |
| ENGLISH | <string name="app_name">app</string> |
| | <string name="app_scan">scan</string> |
| | <string name="app_copy">copy</string> |
| | <string name="app_fax">fax</string> |

| TERMINOLOGY MODULE NAME | TERMINOLOGY MODULE VERSION | APPLICATION NAME | APPLICATION VERSION | DIFFERENCE FILE IN JAPANESE | DIFFERENCE FILE IN ENGLISH | ... |
|---|---|---|---|---|---|---|
| TERMINOLOGY MODULE 40a | 1.0 | APPLICATION 30a | 1.5 | ja dif.csv | en dif.csv | ... |

FIG. 13B ja dif.csv

| TERM ID | CHARACTER STRING OF TERMINOLOGY FILE OF APPLICATION |
|---|---|
| app_scan | スキャン |
| app_copy | コピー |
| app_fax | ファックス |

FIG. 13C en dif.csv

| TERM ID | CHARACTER STRING OF TERMINOLOGY FILE OF APPLICATION |
|---|---|
| app_scan | scan |
| app_copy | copy |
| app_fax | fax |

FIG. 16

TRANSMISSION HISTORY MANAGEMENT TABLE 230

| TERMINOLOGY MODULE NAME | TERMINOLOGY MODULE VERSION | APPLICATION NAME | APPLICATION VERSION | TRANSMISSION HISTORY INFORMATION | |
|---|---|---|---|---|---|
| | | | | LAST NOTIFICATION DATE | THE NUMBER OF TIMES TRANSMITTING NOTIFICATION INFORMATION TO APPLICATION SERVER 50 |
| TERMINOLOGY MODULE 40a | 1.0 | APPLICATION 30a | 1.5 | 2017/1/14 15:19 | 12 |
| TERMINOLOGY MODULE 40a | 1.1 | APPLICATION 30a | 1.2 | 2017/2/24 09:43 | 6 |
| TERMINOLOGY MODULE 40b | 1.0 | APPLICATION 30a | 1.2 | 2017/1/31 11:20 | 4 |
| ... | ... | ... | ... | ... | ... |

FIG. 21

TERMINOLOGY MODULE MANAGEMENT TABLE 530

| TERMINOLOGY MODULE NAME | TERMINOLOGY MODULE VERSION | RELATED MODULE NAME |
|---|---|---|
| TERMINOLOGY MODULE 40a | 1.0 | TERMINOLOGY MODULE 40b |
| TERMINOLOGY MODULE 40b | 1.1 | TERMINOLOGY MODULE 40b, TERMINOLOGY MODULE 40c |
| TERMINOLOGY MODULE 40b | 1.0 | TERMINOLOGY MODULE 40c |
| ... | ... | ... |

INFORMATION PROCESSING APPARATUS, INFORMATION PROCESSING SYSTEM, AND METHOD OF UPDATING FILE

CROSS-REFERENCE TO RELATED APPLICATION

This application claims priority pursuant to 35 U.S.C. § 119(a) to Japanese Patent Application No. 2018-060166, filed on Mar. 27, 2018 in the Japan Patent Office, the disclosure of which is incorporated by reference herein in its entirety.

BACKGROUND

Technical Field

This disclosure relates to an information processing apparatus, an information processing system, and a method of updating a file.

Background Art

Applications having a user interface (UI) applicable to a multilingual display are installed on information processing apparatuses, such as multifunctional peripheral (MFP) and printer, in which a language used for displaying information on a display can be switched between different languages in accordance with a user's setting. With this application, there is a desire to increase the types of language that can be used for displaying information and to replace terms that are displayed on a screen even when the same language is used.

For example, a terminology module created by a third party can be installed on an information processing apparatus to enable a display of terms that are not included in an existing application. Thus, when the information processing apparatus is to add another language or replace terms, the desired terminology module can be incorporated into the information processing apparatus, with which a display screen matched to an intension of a user can be displayed.

SUMMARY

As one aspect of the present invention, an information processing apparatus is devised. The information processing apparatus includes a memory that stores an application and a module related to an operation of the application, and circuitry configured to detect a difference between a first character string included in a first file associated with the application and a second character string included in a second file associated with the module as difference information, the second character string corresponding to the first character string, transmit the difference information indicating the detected difference to a server, and update the second file in accordance with an update notification of the second file transmitted from the server.

As another aspect of the present invention, an information processing system of processing information is devised. The information processing system includes an information processing apparatus installed with an application and a module related to an operation of the application, and a server that communicates with the information processing apparatus via a network. The information processing apparatus includes circuitry configured to detect a difference between a first character string included in a first file associated with the application and a second character string included in a second file associated with the module as difference information, the second character string corresponding to the first character string, transmit the difference information indicating the detected difference to the server, and update the second file in accordance with an update notification of the second file transmitted from the server. The server includes another circuitry configured to receive the difference information from the information processing apparatus, determine whether to transmit the difference information received from the information processing apparatus to another server that has created the module based on transmission history information indicating a transmission history of the difference information, and transmit the difference information to the another server in response to a determination to transmit the difference information to the another server.

As another aspect of the present invention, a method of updating a file for an information processing apparatus installed with an application and a module related to an operation of the application is devised. The method includes detecting a difference between a first character string included in a first file associated with the application and a second character string included in a second file associated with the module as difference information, the second character string corresponding to the first character string, transmitting the difference information indicating the detected difference to a server, and updating the second file in accordance with an update notification of the second file transmitted from the server.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIGS. 5A, 5B and 5C (FIG. 5) illustrate examples of terminology file according to the first embodiment;

FIG. 6 illustrates an example of a term identification (ID) management table according to the first embodiment;

FIG. 7 illustrates an example of a priority management table according to the first embodiment;

FIG. 8 illustrates an example of a notification history management table according to the first embodiment;

FIG. 9 illustrates an example of a notification destination management table according to the first embodiment;

FIG. 11 is an example of a sequence diagram illustrating a process of updating a terminology module in the information processing system according to the first embodiment;

FIGS. 12A and 12B (FIG. 12) illustrate an example of contents of a terminology file before and after updating the terminology file included in an application according to the first embodiment;

FIGS. 13A, 13B and 13C (FIG. 13) illustrate examples of notification information according to the first embodiment;

FIG. 16 illustrates an example of a transmission history management table according to the second embodiment;

FIG. 21 illustrates an example of a terminology module management table according to the fourth embodiment.

Figure 1:
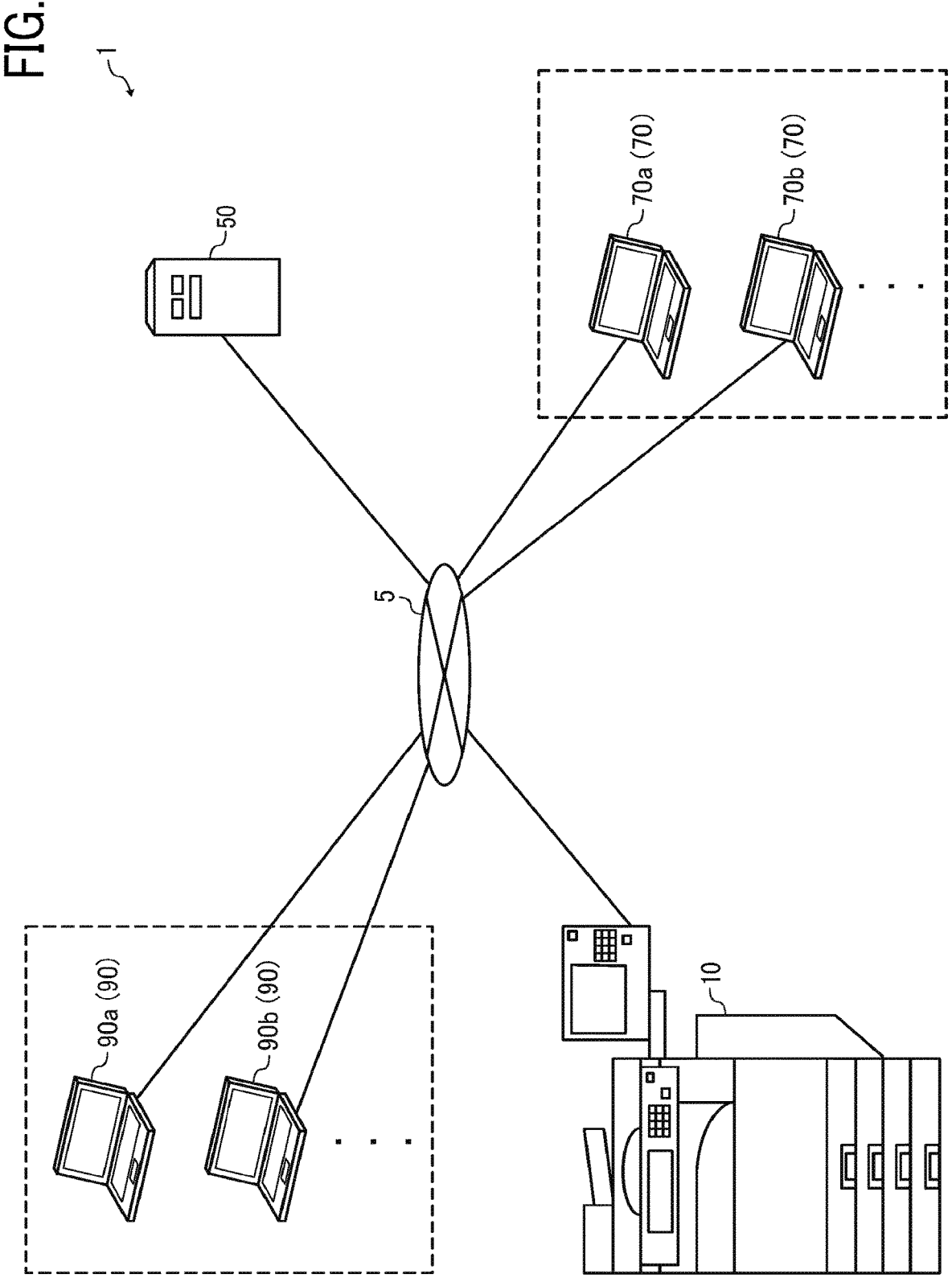
FIG. 1 illustrates an example of a system configuration of an information processing system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a configuration of one or more embodiments of the present invention with reference to the drawings. It is to be noted that the same reference numerals are assigned to the same elements in the description of the drawings, and the overlapping descriptions will be omitted.

First Embodiment

System Configuration:

FIG. 1 illustrates an example of a system configuration of an information processing system 1 according to a first embodiment. As illustrated in FIG. 1, the information processing system 1 includes, for example, an information processing apparatus 10 installed with one or more applications and one or more modules related to an operation of the one or more applications. In the information processing system 1, when a specific application is updated in the information processing apparatus 10, a specific module related to the operation of the updated specific application can be also updated following the updating of the specific application.

As illustrated in FIG. 1, the information processing system 1 includes, for example, the information processing apparatus 10, an application server 50, an application creation apparatus 70, and a terminology module creation apparatus 90. The application creation apparatus 70 includes, for example, application creation apparatuses 70a and 70b, and so on. The terminology module creation apparatus 90 includes, for example, terminology module creation apparatus modules 90a and 90b, and so on. Each of the apparatuses and devices configuring the information processing system 1 is connected via a communication network 5. The communication network 5 is constructed by, for example, a local area network (LAN), a dedicated line, and the Internet. The communication network 5 may use not only a wired communication but also a wireless communication such as Wireless Fidelity (Wi-Fi) or Bluetooth (registered trademark).

The information processing apparatus 10 includes, for example, an image forming function, such as a multifunction peripheral (MFP), a facsimile, a scanner, a printer, and a communication function. The information processing apparatus 10 installs one or more applications (hereinafter, referred to as application) provided by the application server 50 and/or the application creation apparatus 70. The application installed on the information processing apparatus 10 has at least one terminology file written in a given specific language. The information processing apparatus 10 can access the terminology file linked or associated with the installed application. When the specific application is executed, the information processing apparatus 10 uses terms included in the terminology file to display a screen image on an operation panel.

Further, the information processing apparatus 10 includes at least one terminology module as a module related to an operation of the specific application. The terminology module is used when to add and replace one or more terms to be displayed on a specific display screen corresponding to the specific application. When the information processing apparatus 10 is to display a specific display screen corresponding to a specific application using a second language, which is different from a first language currently used for describing the terminology file related to the specific application, the information processing apparatus 10 replaces one or more to-be-displayed terms using a terminology module corresponding to the second language.

In a case that the application is widely distributed to different countries and regions using different languages, the burden of developing and managing the application becomes heavy if the display-use language of the application is to be corresponded to all languages used by users. Therefore, if a person in charge of the application distribution area creates a specific terminology module and installs the specific terminology module, corresponding to a specific language desired by a specific user, on the information processing apparatus 10, the specific language, which was not set in the information processing apparatus 10 when the application was originally created, can be displayed on an operation panel of the information processing apparatus 10.

The application server 50 is a server that manages one or more applications and one or more terminology modules installed on the information processing apparatus 10. The application server 50 can update the application and provide the updated application to the information processing apparatus 10. The application creation apparatuses 70*a* and 70*b* creates an application to be provided to the information processing apparatus 10. The application creation apparatuses 70*a* and 70*b* can be configured to create different applications. Further, the application server 50 can be configured to include a function of the application creation apparatus 70.

The terminology module creation apparatus 90 is an external apparatus or device that creates one or more modules related to an operation of one or more applications. The terminology module creation apparatus 90 (creation apparatus) can create one or more terminology modules to set, modify, or adjust terms displayed on the display screen corresponding to one or more applications. For example, the terminology module creation apparatus 90 may be deployed at each region or each country to create the terminology module associated with the specific language that is used in each specific region and/or each specific country. The terminology module can be created by a third party, such as volunteers or some vendors using the terminology module creation apparatus 90. The terminology module creation apparatus 90 provides the created terminology module to the information processing apparatus 10 via the communication network 5.

Further, when the application installed on the information processing apparatus 10 is updated, the terminology module creation apparatus 90 acquires the difference between the term included in the updated application and the term included in the terminology module from the application server 50. Then, the terminology module creation apparatus 90 updates and creates the terminology file using the difference information. Thus, the terminology module creation apparatus 90 can create the terminology module corresponding to the contents of the application installed on the information processing apparatus 10. In this description, the term means one or more terms.

The information processing apparatus 10 is not limited to an image forming apparatus if the information processing apparatus is equipped with a communication function. The information processing apparatus 10 can be, for example, a projector (PJ), an interactive white board (IWB) having a function of electronically processing and communicating information, an output device such as a digital signage, a head-up display (HUD) device, an industrial machine, an imaging device, an audio collection device, a medical device, a networked home appliance, a note personal computer (PC), a mobile phone, a smartphone, a tablet terminal, a personal computer, a personal digital assistant (PDA), a digital camera, a wearable PC, a desktop PC, or the like.

Figure 2:
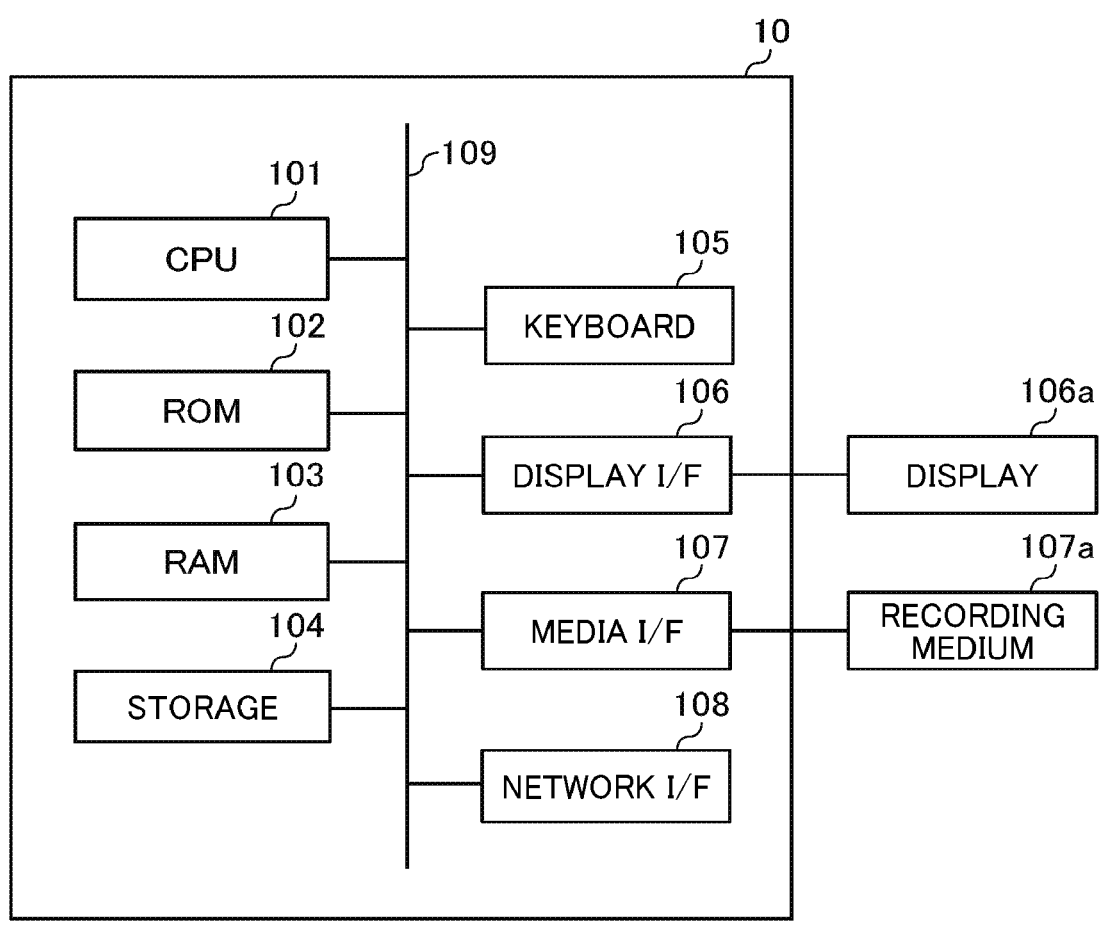
FIG. 2 illustrates an example of hardware block diagram of an information processing apparatus according to the first embodiment.

Hardware Configuration:

FIG. 2 illustrates an example of hardware block diagram of the information processing apparatus 10 according to the first embodiment. It should be noted that the hardware configuration illustrated in FIG. 2 may be similar to that of each embodiment described in this specification, and the components may be added or deleted if necessary. Further, although FIG. 2 illustrates the hardware configuration of the information processing apparatus 10, the application server 50, the application creation apparatus 70, and the terminology module creation apparatus 90 may also employ the similar configuration.

As illustrated in FIG. 2, the information processing apparatus 10 includes, for example, a central processing unit (CPU) 101, a read only memory (ROM) 102, a random access memory (RAM) 103, a storage 104, a keyboard 105, a display interface (I/F) 106, a media interface (I/F) 107, a network interface (I/F) 108, and a bus 109.

The CPU 101, which is one or more processors, performs each function of the information processing apparatus 10 by executing one or more programs stored in the ROM 102 and/or the storage 104 using the RAM 103 as a work area. The information processing apparatus 10 implements an updating method according to each embodiment, for example, by executing one or more programs by the CPU 101. Alternatively, any part of the functions to be executed by the CPU 101 may be performed by a circuit.

The ROM 102 is a nonvolatile memory capable of retaining programs or data even when a power supply is turned off. The ROM 102 employs, for example, a flash ROM or the like. The ROM 102 installs applications such as software development kit (SDK) and application programming interface (API). Functions and network connection of the information processing apparatus 10 can be implemented using the installed applications.

The RAM 103 is a volatile memory, which is used as a work area of the CPU 101. The storage 104 is a storage device such as a hard disk drive (HDD), a solid state drive (SSD), or the like. The storage 104 stores, for example, an operating system (OS), one or more application programs, various data, and the like.

The keyboard 105 is a type of input device provided with a plurality of keys for inputting characters, numerals, various instructions, and the like. The display I/F 106 controls displaying of various information, such as a cursor, menus, windows, characters, and images on a display 106*a*, such as a liquid crystal display (LCD). The display 106*a* can be a touch panel display provided with an input device. The media I/F 107 controls data reading or writing (storing) of data to a recording medium 107*a*, such as a universal serial bus (USB) memory, a memory card, an optical disk, or a flash memory.

The network I/F 108 is an interface for communicating data via the communication network 5. The network I/F 108 is, for example, a communication interface of a wireless LAN. The network I/F 108 can include a communication interface using wired LAN, 3G (3rd Generation), LTE (Long Term Evolution), 4G (4th Generation), 5G (5th Generation), and millimeter wave radio.

The bus 109 is connected to each of the above components to transmit address signals, data signals, and various control signals. The CPU 101, the ROM 102, the RAM 103, the storage 104, the keyboard 105, the display I/F 106, the media I/F 107 and the network I/F 108 are connected to each other via the bus 109.

Figure 3:
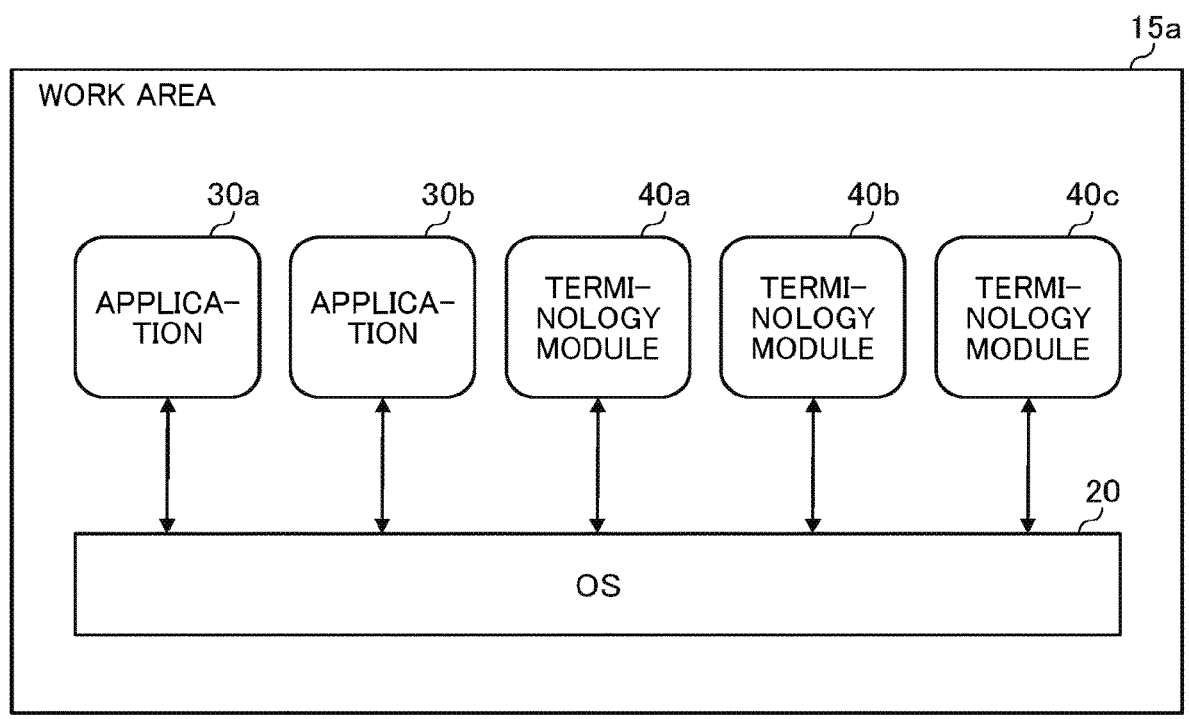
FIG. 3 illustrates an example of a software configuration of the information processing apparatus according to the first embodiment.

Software Configuration:

Hereinafter, a description is given of an example of a software configuration of the information processing apparatus 10 with reference to FIG. 3. FIG. 3 illustrates an example of a software configuration of the information processing apparatus 10 according to the first embodiment. For example, as illustrated in FIG. 3, an OS 20, an application 30a, an application 30b, a terminology module 40a, a terminology module 40b, and a terminology module 40c operate on a work area 15a of RAM 103. The OS 20, which provides basic functions of the information processing apparatus 10, is the basic software that manages the information processing apparatus 10 entirely. The OS 20 is, for example, Android (registered trademark) firmware (F/W).

The application 30a and the application 30b are applications for implementing the functions of the information processing apparatus 10. The application 30a and the application 30b are created by the application creation apparatus 70, and then transmitted from the application creation apparatus 70 or the application server 50 to the information processing apparatus 10. In FIG. 3, although the application 30 is provided outside the OS 20, the function of the application 30 can be incorporated into the OS 20.

The terminology module 40a, the terminology module 40b, and the terminology module 40c are modules related to the operation of the application 30. The terminology module 40a, the terminology module 40b, and the terminology module 40c are created by the terminology module creation apparatus 90, and then transmitted from the terminology module creation apparatus 90 or the application server 50 to the information processing apparatus 10. The terminology module 40 is described in the same or similar format as the application 30.

FIG. 3 illustrates an example in which two applications, such as the application 30a and application 30b, are installed on the information processing apparatus 10, but the number of applications 30 installed on the information processing apparatus 10 is not limited thereto. Further, although FIG. 3 illustrates an example case where three terminology modules, such as the terminology module 40a, the terminology module 40b, and the terminology module 40c, are installed on the information processing apparatus 10, the number of the terminology modules 40 installed on the information processing apparatus 10 is not limited thereto.

Figure 4:
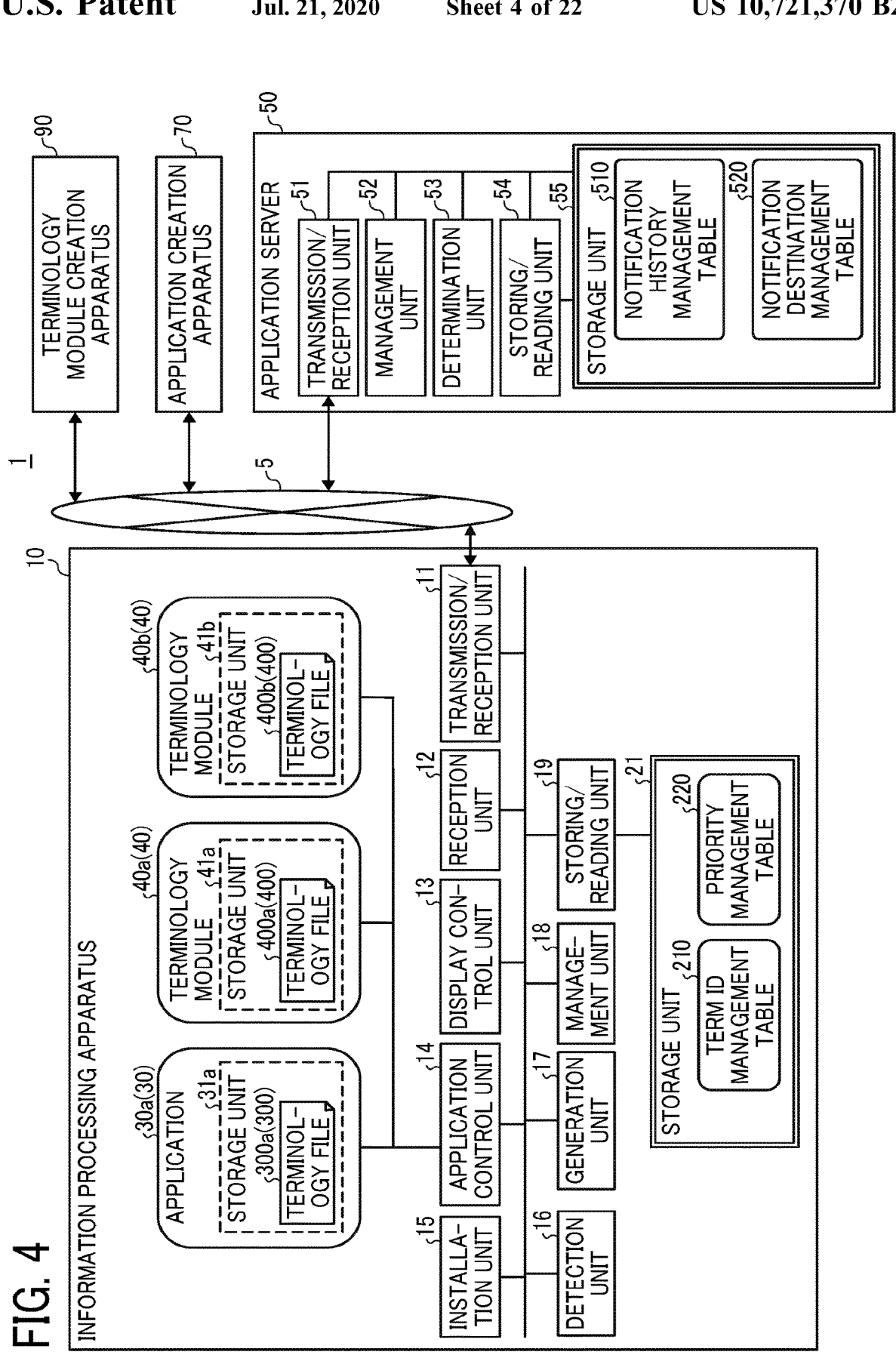
FIG. 4 illustrates an example of a functional block diagram of the information processing system according to the first embodiment.

Functional Configuration:

Hereinafter, a description is given of a functional configuration of the information processing system 1 according to the first embodiment. FIG. 4 illustrates an example of the functional block diagram of the information processing system 1 according to the first embodiment. FIG. 4 illustrates an example case when the application 30a, the terminology module 40a and the terminology module 40b are installed on the information processing apparatus 10.

As illustrated in FIG. 4, the functions implemented by the information processing apparatus 10 include, for example, a transmission/reception unit 11, a reception unit 12, a display control unit 13, an application control unit 14, an installation unit 15, a detection unit 16, a generation unit 17, a management unit 18, a storing/reading unit 19, and a storage unit 21.

The transmission/reception unit 11 performs a function of transmission/reception of various data to and from an external apparatus or device via the communication network 5. The transmission/reception unit 11 receives the application 30 transmitted from the application server 50 or the application creation apparatus 70. Further, the transmission/reception unit 11 receives the terminology module 40 transmitted from the application server 50 or the terminology module creation apparatus 90. Further, the transmission/reception unit 11 transmits notification information 100 including data indicating a difference between the term included in the terminology file 300 associated with the application 30 and the term corresponding to the term included in the terminology file 300 and included in the terminology file 400 associated with the terminology module 40, to the application server 50. The transmission/reception unit 11 is implemented by the network I/F 108 and the program executed by the CPU 101 illustrated in FIG. 2. The transmission/reception unit 11 is an example of a first transmission unit.

The reception unit 12 receives an input operation by a user to the input device such as the keyboard 105 illustrated in FIG. 2. The reception of the input operation by the user means that receiving information (including a signal indicating a coordinate value on a screen) input in accordance with a user's operation. The reception unit 12 receives an input of language setting of the display screen to be displayed on the display 106a. The reception unit 12 is implemented by the program executed by the CPU 101 illustrated in FIG. 2.

The display control unit 13 displays an operation screen for receiving the input operation by the user on the display 106a illustrated in FIG. 2. The display control unit 13 displays a display screen of the executed application 30 on the display 106a. The display control unit 13 is implemented by the program executed by the CPU 101 illustrated in FIG. 2.

The application control unit 14 controls the operation of the application 30 and the terminology module 40 installed on the information processing apparatus 10. When the transmission/reception unit 11 receives an update notification indicating that the application 30 or the terminology module 40 is updated, the application control unit 14 updates the corresponding application 30 or the terminology module 40. The application control unit 14 is implemented by the program executed by the CPU 101 illustrated in FIG. 2.

The installation unit 15 is an installer that is used to install the application 30 and the terminology module 40 on the information processing apparatus 10. The installation unit 15 installs the application 30 and the terminology module 40 received by the transmission/reception unit 11 on the information processing apparatus 10. The installation unit 15 is implemented by the program executed by the CPU 101 illustrated in FIG. 2.

As illustrated in FIG. 3, the application 30a is an application installed on the information processing apparatus 10 by the installation unit 15. The application 30a stores a terminology file 300a in the storage unit 31a. The terminology file 300a includes data, which describes terms to be displayed on a display screen displayed by executing the application 30a, as a string of characters (character string). The information processing apparatus 10 can install not only the application 30a but also a plurality of applications 30. The application 30 stores the terminology file 300 corresponding to each language format.

The terminology module 40a and the terminology module 40b illustrated in FIG. 3 are modules installed on the information processing apparatus 10 by the installation unit 15. As illustrated in FIG. 4, the terminology module 40a stores the terminology file 400a corresponding to one available language in the storage unit 41a. Similarly, the terminology module 40b stores a terminology file 400b corresponding to another available language in the storage unit 41*b*. The available language is a language for use corresponding to each terminology file 400.

Terminology File:

Hereinafter, a description is given of a terminology file stored in the application 30 and the terminology module 40. FIGS. 5A, 5B and 5C (FIG. 5) illustrate examples of the terminology file according to the first embodiment. The terminology file describes data using a given format, such as xml (Extensible Markup Language) format.

FIG. 5A illustrates the terminology file 300*a* stored in the application 30*a*. The terminology file 300*a* includes descriptions set for each one of a plurality of languages. The terminology file 300*a* describes each term having the same term ID in each terminology file. The term ID is, for example, a character string used for identifying each term to be displayed on the display screen corresponding to the application 30*a*.

The information processing apparatus 10 displays a character string of each term corresponding to the term ID by designating the term ID at a position where the character string is to be displayed on the display screen corresponding to the application 30*a*. When the available language is "Japanese," the information processing apparatus 10 displays a character string of "application (described in Japanese characters of "katakana" in FIG. 5A)" at a portion on the display screen where the term ID of "app_name" is designated. On the other hand, when the available language is "English," the information processing apparatus 10 displays a character string of "application (described in "app" in FIG. 5A)" at a portion on the display screen where the term ID of "app_name" is designated. The terminology file 300 is used as an example of a first file in this description.

FIG. 5B is a terminology file 400*a* stored in the terminology module 40*a*. The terminology file 400*a* is applied when the term included in the display screen corresponding to the application 30*a* is rewritten using the terminology module 40*a*. The terminology file 400*a* describes each term having the term ID that matches the term ID included in the terminology file 300*a*. For example, the terminology file 400*a* describes German-translated term of "anwendung" for the term ID of "app_name." In this case, when the available language is "German," the information processing apparatus 10 displays a character string of "anwendung (see FIG. 5B)" at a portion on the display screen where the term ID of "app_name" is designated.

FIG. 5C is a terminology file 400*b* stored in the terminology module 40*b*. The terminology file 400*b* is applied when the term included in the display screen corresponding to the application 30*a* is rewritten using the terminology module 40*b*. Similar to the terminology file 400*a*, the terminology file 400*b* describes each term having the term ID that matches the term ID included in the terminology file 300*a*. The terminology file 400*b* describes a French-translated term of "app" and an Italian-translated term of "applicazione" for the term ID of "app_name." In this case, if the available language is "French," the information processing apparatus 10 displays the character string of "app" on a portion of the display screen where the term ID of "app_name" is designated. On the other hand, when the available language is "Italian," the information processing apparatus 10 displays the character string of "applicazione" on a portion of the display screen where the term ID of "app_name" is designated. The terminology file 400 is used as an example of a second file in this description.

Referring back to FIG. 4, the functional configuration of the information processing apparatus 10 is continued to be described. The detection unit 16 detects a difference between the terminology file 300 stored by the application 30 and the terminology file 400 stored in the terminology module 40. The detection unit 16 detects a difference between the term ID described in the terminology file 300 and the term ID described in the terminology file 400. The detection unit 16 is implemented by the program executed by the CPU 101 illustrated in FIG. 2.

If the application 30 is updated and a new term ID is added to the terminology file 300, there is a difference between the term ID included in the terminology file 300 of the application 30 and the term ID included in the terminology file 400 of the terminology module 40, in which the information processing apparatus 10 cannot rewrite the term corresponding to the term ID newly added to the terminology file 300 using the existing terminology module 40, and thereby the information processing apparatus 10 needs to perform processing to adjust the difference. Therefore, the information processing apparatus 10 updates the existing terminology module 40 to adjust the difference.

The generation unit 17 generates notification information 100, to be transmitted to the terminology module creation apparatus 90, based on data indicating the difference detected by the detection unit 16. The details of the notification information 100 will be described later. The generation unit 17 is implemented by the program executed by the CPU 101 illustrated in FIG. 2.

The management unit 18 manages a term ID management table 210 (FIG. 6) and a priority management table 220 (FIG. 7) stored in the storage unit 21. The management unit 18 registers and changes data included in the term ID management table 210 and the priority management table 220. The management unit 18 is implemented by the program executed by the CPU 101 illustrated in FIG. 2.

The storing/reading unit 19 stores various data in the storage unit 21 and reads various data from the storage unit 21. The storing/reading unit 19 and the storage unit 21 are implemented by the ROM 102, the storage 104, and the program executed by the CPU 101, which are illustrated in FIG. 2. Further, the storage unit 21 stores the term ID management table 210 and the priority management table 220.

Term ID Management Table:

Hereinafter, a description is given of example of data stored in the storage unit 21. FIG. 6 illustrates an example of the term ID management table 210 according to the first embodiment. As illustrated in FIG. 6, the term ID management table 210 is a table that manages a correspondence relationship between the character string and the term ID described in the terminology file 300 associated with the application 30 and a correspondence relationship between the character string and the term ID described in the terminology file 400 associated with the terminology module 40.

The term ID management table 210 associates and stores the term ID, type of the application 30 (application name), term identification information of the application 30, type of the terminology module 40 (terminology module name), and term identification information of the terminology module 40 to manage these information.

The term ID is, for example, a string of characters (character string) identifying the term to be displayed on the display screen corresponding to the application 30. The term identification information of the application 30 is the identification information in the application 30 for the term corresponding to the associated term ID. The term identification information of the terminology module 40 is the identification information in the terminology module 40 for the term corresponding to the associated term ID. The term ID management table 210 manages the term identification information of the application 30 and the terminology module 40 using a unique value, such as number, instead the character string such as the term ID of "app_name."

As to the term identification information of the application 30 and the terminology module 40, different numbers are assigned to the application 30 and the terminology module 40 for the same term ID. Therefore, the term ID management table 210 maintains the correspondence relationship between the term identification information of the application 30 and the term identification information of the terminology module 40 for the same term ID.

Further, the term ID and the term identification information are created or changed when the application 30 or the terminology module 40 is updated. Further, the term ID management table 210 can be provided for each terminology module 40 associated with the application 30. In this case, for example, if the terminology modules 40a and 40b related to the application 30a exist, one table to store the correspondence relationship between the application 30a and the terminology module 40a, and another table to store the correspondence relationship between the application 30a and the terminology module 40b are separately provided.

Priority Management Table:

FIG. 7 illustrates an example of the priority management table 220 according to the first embodiment. As illustrated in FIG. 7, the priority management table 220 defines which terminology module is preferentially used to display one or more term on the display screen corresponding to the application 30. The priority management table 220 manages information indicating the priority level of the terminology module 40 for each type (application name) of the application 30.

As to the priority management table 220, for example, the application 30a applies the terms included in the terminology files respectively stored in the terminology module 40a, the terminology module 40b, and the application 30a to the display screen in the order of the terminology module 40a, the terminology module 40b, and the application 30a. For example, if the term ID that corresponds to the term included in the display screen does not exist in the terminology module 40a having the highest priority level, the application 30a uses the term in the terminology module 40b having the second highest priority level (next highest priority level). Further, for example, the application 30b applies the terms included in the terminology files respectively stored in the terminology module 40c and the application 30b to the display screen in the order of the terminology module 40c and the application 30b in accordance with the priority level.

For example, when the information processing apparatus 10 is activated, a value of "android: priority" defined in all of the terminology modules installed on the information processing apparatus 10 are acquired and compared by the management unit 18 to create the priority management table 220.

Hereinafter, a description is given of a functional configuration of the application server 50 illustrated in FIG. 4. The functions implemented by the application server 50 include, for example, a transmission/reception unit 51, a management unit 52, a determination unit 53, a storing/reading unit 54, and a storage unit 55.

The transmission/reception unit 51 performs a function of transmission/reception of various data to and from an external apparatus or device via the communication network 5. The transmission/reception unit 51 transmits the application 30 created or updated by the application creation apparatus 70 or the application server 50 to the information processing apparatus 10. Further, the transmission/reception unit 51 transmits the terminology module 40 created or updated by the terminology module creation apparatus 90 to the information processing apparatus 10. Further, the transmission/reception unit 51 receives the notification information 100 including data indicating the difference between the terminology file 300 associated with the application 30 and the terminology file 400 associated with the terminology module 40 from the information processing apparatus 10. The transmission/reception unit 51 is implemented by the network I/F 108 and the program executed by the CPU 101 illustrated in FIG. 2.

The management unit 52 manages a notification history management table 510 (FIG. 8) and a notification destination management table 520 (FIG. 9) stored in the storage unit 55. The management unit 52 registers and updates data included in the notification history management table 510 and the notification destination management table 520. The management unit 52 is implemented by the program executed by the CPU 101 illustrated in FIG. 2.

The determination unit 53 determines whether or not to transmit the notification information 100, which is received from the information processing apparatus 10, to the terminology module creation apparatus 90 that has created the terminology module 40 based on the notification history management table 510. The determination unit 53 is implemented by the program executed by the CPU 101 illustrated in FIG. 2.

The storing/reading unit 54 stores various data in the storage unit 55 and reads various data from the storage unit 55. The storing/reading unit 54 and the storage unit 55 are implemented by the ROM 102, the storage 104, and the program executed by the CPU 101 illustrated in FIG. 2. Further, the storage unit 55 stores the notification history management table 510 and the notification destination management table 520.

Notification History Management Table:

Hereinafter, a description is given of examples of data stored in the storage unit 55. FIG. 8 illustrates an example of the notification history management table 510 according to the first embodiment. As illustrated in FIG. 8, the notification history management table 510 manages a transmission history of the notification information 100, which has been transmitted from the application server 50 to the terminology module creation apparatus 90. The notification history management table 510 stores the notification history information of the notification information 100 in association with each type of the terminology module 40 (terminology module name), each version of the terminology module 40 (terminology module version), each type of the application 30 (application name) and each version of the application 30 (application version).

The notification history management table 510 manages the notification history information, which is a transmission history of the notification information 100 to the specific terminology module creation apparatus 90, for each combination of the version of the terminology module 40 and the version of the application 30. In FIG. 8, the notification history information includes, for example, the last notification date of the notification information 100 and the number of times transmitting the notification information 100 to the terminology module creation apparatus 90 (the number of times notifying the notification information to the creation source).

The application server 50, using the notification history information included in the notification history management table 510, prevents the notification information 100 from being transmitted again to the terminology module creation apparatus 90 that has already transmitted the notification information 100. Further, the application server 50 can be configured not to notify the notification information 100 to the terminology module creation apparatus 90 for a given period of time after the notification information 100 was notified at the last time (most recent time), using the last notification date included in the notification history management table 510. Further, the application server 50 can also prevent the same notification from being notified to the terminology module creation apparatus 90 for a given number of times or more using the number of times notifying the notification information 100 to the terminology module creation apparatus 90.

Notification Destination Management Table:

FIG. 9 illustrates an example of the notification destination management table 520 according to the first embodiment. As illustrated in FIG. 9, the notification destination management table 520 is a table that manages an address of the terminology module creation apparatus 90, which is a notification destination of the notification information 100.

The notification destination management table 520 stores address information of the terminology module creation apparatus 90, which has created the terminology module 40, in association with each type (terminology module name) and each version of the terminology module 40 (terminology module version). The address information is information identifying a location of the terminology module creation apparatus 90, which has created the associated or related terminology module 40.

As illustrated in FIG. 9, the address information is, for example, an e-mail address associated with the terminology module creation apparatus 90. In this example case, the application server 50 transmits the notification information 100 to the corresponding e-mail address using an e-mail format using simple mail transfer protocol (SMTP) or the like. Further, the address information can be any information indicating a location of the terminology module creation apparatus 90 on the network, such as internet protocol (IP) address. In this case, the application server 50 transmits the notification information 100 to the IP address associated with the terminology module creation apparatus 90 using, for example, hypertext transfer protocol (HTTP) communication. Further, the terminology module creation apparatus 90 can be configured to perform a polling to the application server 50 to acquire the notification information 100 from the application server 50.

In an example case in FIG. 9, the notification destination management table 520 stores the address information for each version of the terminology module 40, but not limited thereto. For example, if the same terminology module creation apparatus 90 has created each version of the terminology module 40, one address information associated with the terminology module creation apparatus 90 alone may be stored in the notification destination management table 520. Further, the information processing apparatus 10 can be configured to install different notification applications for different notification destination instead of the notification destination management table 520. In this case, the information processing apparatus 10 can add the notification destination by installing the notification application at any time whenever necessary.

Figure 10:
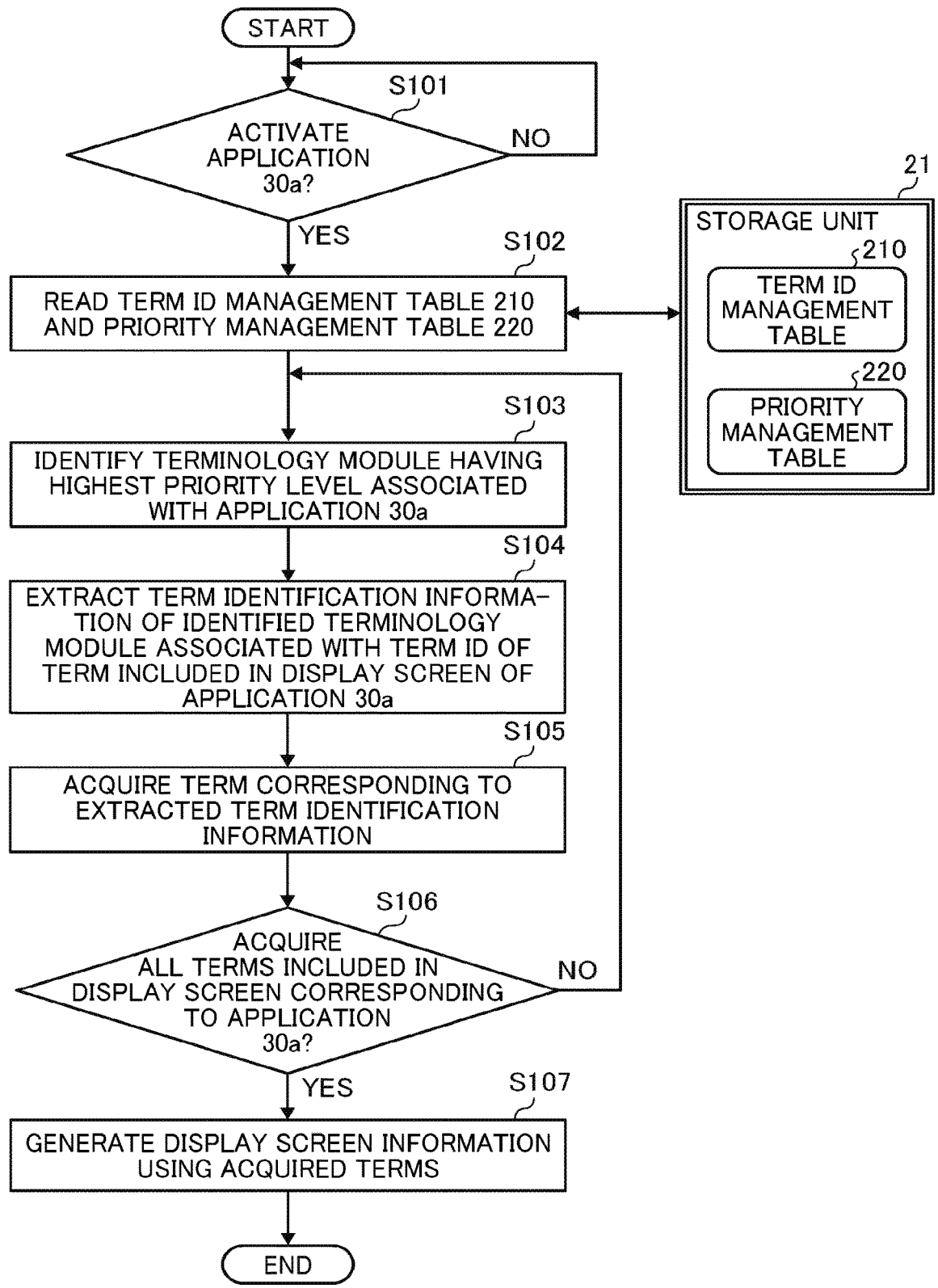
FIG. 10 is an example of a flowchart illustrating the steps of a process of generating display screen information in the information processing apparatus according to the first embodiment.

Generation Process of Display Screen Information:

Hereinafter, a description is given of a process of generating display screen information to be displayed on the information processing apparatus 10. FIG. 10 is an example of a flowchart illustrating the steps of a process of generating display screen information in the information processing apparatus 10 according to the first embodiment. FIG. 10 illustrates an example case that the information processing apparatus 10 activates the application 30*a*.

In step S101, when the application control unit 14 activates the application 30*a*, the application control unit 14 proceeds the sequence to step S102. On the other hand, if the application control unit 14 does not activate the application 30*a*, the application control unit 14 repeats step S101.

In step S102, the application control unit 14 reads out the term ID management table 210 and the priority management table 220 stored in the storage unit 21. Specifically, the application control unit 14 outputs a read request of the term ID management table 210 and the priority management table 220 to the storing/reading unit 19. When the storing/reading unit 19 detects the read request, the storing/reading unit 19 reads out the term ID management table 210 and the priority management table 220 stored in the storage unit 21. Then, the storing/reading unit 19 outputs the read term ID management table 210 and the priority management table 220 to the application control unit 14.

In step S103, the application control unit 14 identifies a terminology module having the highest priority level associated with the application 30*a* from the read priority management table 220. For example, the application control unit 14 identifies the terminology module 40*a* as the terminology module having the highest priority level in the priority management table 220 illustrated in FIG. 7.

In step S104, the application control unit 14 extracts the term identification information of the identified terminology module 40 associated with the term ID of the term included in the display screen corresponding to the application 30*a* from the read term ID management table 210. For example, when the display screen corresponding to the application 30*a* includes the term corresponding to the term ID of "app_name," the application control unit 14 extracts "0x1002" as the term identification information associated with the terminology module 40*a* from the term ID management table 210 illustrated in FIG. 6.

In step S105, the application control unit 14 acquires a term corresponding to the extracted term identification information. For example, the application control unit 14 acquires "anwendung" as the term corresponding to the extracted term identification information of "0x1002" from the terminology file 400*a* illustrated in FIG. 5B.

In step S106, if the application control unit 14 acquires all of the terms included in the display screen corresponding to the application 30*a* (S106: YES), the application control unit 14 proceeds the sequence to step S107. On the other hand, if at least any one of terms included in the display screen corresponding to the application 30*a* is not yet acquired (S106: NO), the application control unit 14 repeats the sequence from step S103.

In step S107, the display control unit 13 generates display screen information using the terms acquired by the application control unit 14. In an example case in FIG. 10, since the terms are acquired from the terminology file 400*a* of the terminology module 40*a* illustrated in FIG. 5B, the to-be-generated display screen information uses German-translated terms. Then, the display control unit 13 displays the generated display screen information on the display 106*a*.

Updating of Terminology Module:

FIG. 11 is an example of a sequence diagram illustrating a process of updating the terminology module 40 in the information processing system 1 according to the first embodiment. FIG. 11 illustrates an example case of adding a new term to the terminology file 300a associated with the application 30a.

In step S201, the management unit 52 of the application server 50 updates the terminology file 300a of the application 30a. For example, the management unit 52 adds data including a new term and a term ID corresponding to the new term to the terminology file 300a. If the terminology file 300a is updated, the version of the application 30a is changed, for example, from "1.0" to "1.1."

In step S202, the transmission/reception unit 51 of the application server 50 transmits an update notification of the terminology file 300a to the information processing apparatus 10. The update notification includes, for example, the version information of the updated application 30a and the data of the terminology file 300a that is updated in step S201. Then, when the transmission/reception unit 11 of the information processing apparatus 10 receives the update notification of the terminology file 300a, the application control unit 14 of the information processing apparatus 10 updates the terminology file 300a of the application 30a based on the received update notification. Then, the management unit 18 adds the added new term ID and the new term identification information of the application 30a corresponding to the added new term ID to the term ID management table 210 stored in the storage unit 21.

FIGS. 12A and 12B (FIG. 12) illustrate an example of contents of the terminology file 300 before and after updating the terminology file 300 included in the application 30 according to the first embodiment. FIG. 12A is a terminology file 300a before updating and FIG. 12B is a terminology file 300aa after updating. As illustrated in FIG. 12B, the terms corresponding to the term IDs of "app_scan" "app_copy" and "app_fax" are newly added to the terminology file 300aa compared to the terminology file 300a (FIG. 12A).

In step S203, the detection unit 16 of the information processing apparatus 10 detects the difference between the updated terminology file 300a and the terminology file 400 of the terminology module 40. Specifically, the detection unit 16 detects the difference between the terms included in the terminology file 300aa associated with the application 30a and the terms included in the terminology file 400 associated with the terminology module 40 (detection step). The detection unit 16 checks the difference for each term ID included in the term ID management table 210, and if the detection unit 16 detects the difference, the detection unit 16 detects data indicating the difference. In an example case in FIGS. 12A and 12B, the detection unit 16 detects the term IDs of "app_scan," "app_copy" and "app_fax" as the data corresponding to the difference.

In step S204, the generation unit 17 of the information processing apparatus 10 generates the notification information 100 based on the data corresponding to the difference detected by the detection unit 16.

In step S205, the transmission/reception unit 11 of the information processing apparatus 10 transmits the notification information 100 generated by the generation unit 17 to the application server 50 (transmission step).

Hereinafter, a description is given of the contents of the notification information 100. FIGS. 13A, 13B and 13C (FIG. 13) illustrates an example of the notification information 100 according to the first embodiment. FIG. 13A illustrates an example of the contents of the notification information 100. As indicated in FIG. 13A, the notification information 100 includes various item information, such as a terminology module name, a version of terminology module, an application name, an application version, and a difference file including data corresponding to the difference detected by the detection unit 16. The difference file is stored for each language detected as the data corresponding to the difference.

FIG. 13B illustrates a difference file in Japanese 110 (Japanese difference file 110) while FIG. 13C illustrates a difference file in English 120 (English difference file 120). The Japanese difference file 110 and the English difference file 120 store a list of character strings of terms corresponding to the term IDs detected as the data corresponding to the difference. The Japanese difference file 110 and the English difference file 120 do not include a character string corresponding to the term ID where no difference has been detected. If a specific term ID exists in the term ID management table 210 but there is no character string of the specific term ID in the terminology file 300 of the updated application 30, the character string of the Japanese difference file 110 and the character string of the English difference file 120 become blank. The notification information 100 is an example of difference information indicating the difference between the term included in the terminology file 300 associated with the application 30 and the term corresponding to the term included in the terminology file 300 and included in the terminology file 400 associated with the terminology module 40.

Referring back to FIG. 11, the update process of the terminology module 40 is further described.

In step S206, the determination unit 53 of the application server 50 reads out the notification history management table 510 and the notification destination management table 520 stored in the storage unit 55. Specifically, the determination unit 53 outputs a read request of the notification history management table 510 and the notification destination management table 520 to the storing/reading unit 54. When the storing/reading unit 54 detects the read request, the storing/reading unit 54 reads out the notification history management table 510 and the notification destination management table 520 stored in the storage unit 55. Then, the storing/reading unit 54 outputs the read notification history management table 510 and the notification destination management table 520 to the determination unit 53.

In step S207, the determination unit 53 of the application server 50 determines a notification destination of the notification information 100 based on the read notification history management table 510, the notification destination management table 520, and the contents of the notification information 100 received by the transmission/reception unit 51.

Figure 14:
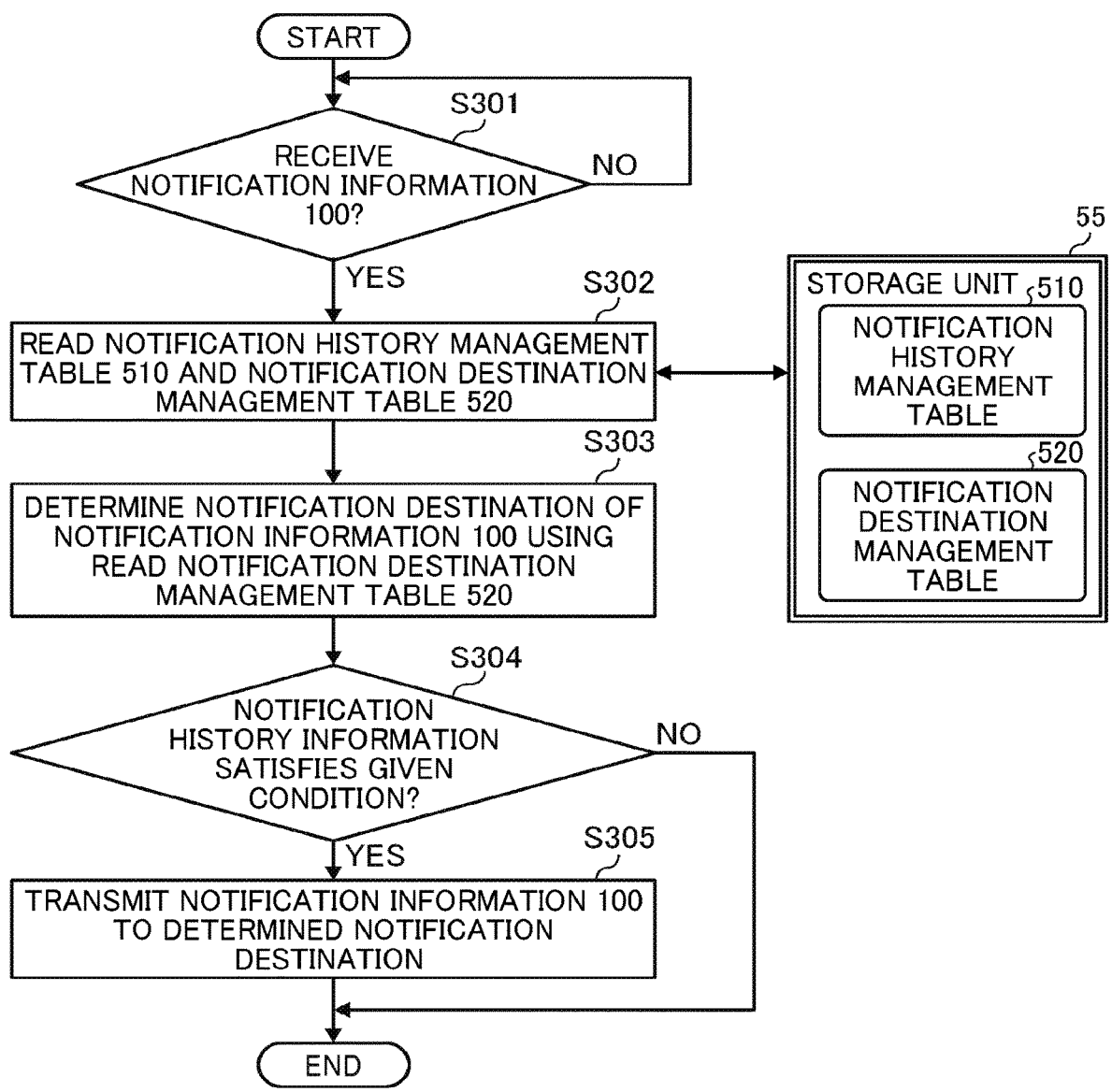
FIG. 14 is an example of a flowchart illustrating the steps of a process of determining a notification destination in an application server according to the first embodiment.

Hereinafter, a description is given of a process of determining the notification destination of the notification information 100 in the application server 50 with reference to FIG. 14. FIG. 14 is an example of a flowchart illustrating the steps of a process of determining the notification destination in the application server 50 according to the first embodiment.

In step S301, if the transmission/reception unit 51 receives the notification information 100 (S301: YES), the determination unit 53 proceeds the sequence to step S302. On the other hand, if the transmission/reception unit 51 has not yet received the notification information 100 (S301: NO), the determination unit 53 repeats step S301.

In step S302, the determination unit 53 reads out the notification history management table 510 and the notification destination management table 520 from the storage unit 55. Specifically, the determination unit 53 outputs a read request of the notification history management table 510 and the notification destination management table 520 to the storing/reading unit 54. When the storing/reading unit 54 detects the read request, the storing/reading unit 54 reads out the notification history management table 510 and the notification destination management table 520 stored in the storage unit 55. Then, the storing/reading unit 54 outputs the read notification history management table 510 and the notification destination management table 520 to the determination unit 53.

In step S303, the determination unit 53 determines the notification destination of the notification information 100 using the read notification destination management table 520. Specifically, the determination unit 53 determines the destination information associated with the information of the terminology module 40 included in the notification information 100, in the notification destination management table 520 as a notification destination. For example, if the notification information 100 illustrated in FIG. 13 is received, the determination unit 53 determines the address information of "xxx@aaa.co.jp" associated with the version "1.0" of the "terminology module 40a" in the notification destination management table 520 illustrated in FIG. 9 as the notification destination.

In step S304, if the notification history information included in the read notification history management table 510 satisfies a given condition (S304: YES), the determination unit 53 proceeds the sequence to step S305. On the other hand, if the notification history information included in the read notification history management table 510 does not satisfy the given condition (S304: NO), the determination unit 53 ends the sequence.

The given condition can be set by an administrator of the application server 50 appropriately. For example, the determination unit 53 can determine that the notification history information included in the read notification history management table 510 satisfies the given condition if a given period of time has elapsed from the date when the notification information 100 was notified at the last time (most recently). Further, the determination unit 53 can determine that the notification history information included in the read notification history management table 510 satisfies the given condition if the notification destination 100 has never been notified to the determined notification destination. Further, the determination unit 53 can determine that the notification history information included in the read notification history management table 510 satisfies the given condition if the number of times notifying the notification information 100 is equal to or less than a given number of times. As above described, the determination unit 53 of the application server 50 determines whether or not to transmit the notification information 100 to the terminology module creation apparatus 90, which is determined as the notification destination, based on the notification history information included in the notification history management table 510.

In step S305, the transmission/reception unit 51 transmits the notification information 100 to the terminology module creation apparatus 90 using the address information, which is the notification destination determined by the determination unit 53.

Referring back to FIG. 11, the update process of the terminology module 40 is further described.

In step S208, the transmission/reception unit 51 of the application server 50 transmits the notification information 100 to the terminology module creation apparatus 90, which is the notification destination identified by the determination unit 53. Further, the management unit 52 of the application server 50 updates or modifies the notification history information, corresponding to the contents of the notification information 100, in the notification history management table 510.

In step S209, the terminology module creation apparatus 90 updates the terminology module 40 based on the contents of the notification information 100 received from the application server 50. The terminology module creation apparatus 90 updates the terminology file 400 associated with the terminology module 40 using data corresponding to the difference between the terminology file 300a and the terminology file 400 included in the notification information 100. For example, if the terminology module creation apparatus 90 receives the notification information 100 illustrated in FIG. 13 from the application server 50, the terminology module creation apparatus 90 adds the terms corresponding to the term IDs of "app_scan," "app_copy" and "app_fax" to the terminology file 400. The language used for the added terms is determined based on the available language of each terminology file 400. Further, if the terminology file 400 is updated, the version of the terminology module 40 is changed for example, from "1.0" to "1.1." With this configuration, when the application 30 installed on the information processing apparatus 10 is updated, the terminology module creation apparatus 90 can create the terminology module 40 corresponding to the contents of the updated application 30.

In step S210, if the terminology module creation apparatus 90 updates the terminology module 40, the terminology module creation apparatus 90 transmits an update notification of the terminology module 40 to the application server 50. The update notification of the terminology module 40 includes, for example, the version information of the updated terminology module 40 and data of the terminology file 400 after updating.

In step S211, the transmission/reception unit 51 of the application server 50 transmits the update notification of the terminology module 40, received from the terminology module creation apparatus 90, to the information processing apparatus 10.

In step S212, the application control unit 14 of the information processing apparatus 10 updates the terminology file 400 of the terminology module 40 stored in the storage unit 41 using the data included in the update notification received by the transmission/reception unit 11 (update step). Then, the management unit 18 adds the version information of the terminology module 40 and the terminology identification information of the terminology module 40 corresponding to the updated term ID included in the update notification, to the term ID management table 210 stored in the storage unit 21.

As described above, the information processing system 1 according to the first embodiment includes, for example, the information processing apparatus 10 including the application 30, the terminology module 40 related to the operation of the application 30, and the application server 50. The information processing apparatus 10 detects the difference between the term included in the terminology file 300 associated with the application 30 and the term corresponding to the term included in the terminology file 300 and included in the terminology file 400 associated with the terminology module 40, and transmits the notification information 100 indicating the detected difference to the application server 50. The application server 50 transmits the notification information 100 to the terminology module creation apparatus 90, which is the creation source of the terminology file 400, and then the terminology module creation apparatus 90 updates the terminology file 400 based on the notification information 100. Then, the information processing apparatus 10 updates the terminology file 400 in accordance with the update notification that is transmitted from the terminology module creation apparatus 90 via the application server 50.

Therefore, when the given application 30 is updated, following the updating of given application 30, the information processing apparatus 10 can update the terminology module 40 associated with the operation of the updated given application 30. Further, since the terminology module creation apparatus 90 can specify or identify the modification portion of the terminology module 40 based on the notification information 100 including the data indicating the difference with respect to the updated application 30, a time period required for updating the terminology module 40 can be shortened. Further, in the information processing system 1, the information processing apparatus 10 disposed at each location does not directly transmits the notification information 100 to the terminology module creation apparatus 90 but the information processing apparatus 10 disposed at each location transmits the notification information 100 to the terminology module creation apparatus 90 via the application server 50, with which the communication processing load associated with updating of the terminology module 40 can be reduced.

Second Embodiment

Hereinafter, a description is given of an information processing system 1A according to a second embodiment. It is to be noted that the same configuration and functions as those of the first embodiment are denoted by the same reference numerals, and the description thereof will be omitted. In the information processing system 1A according to the second embodiment, an information processing apparatus 10A determines whether or not to transmit the notification information 100 to the application server 50 based on the transmission history of the notification information 100.

Figure 15:
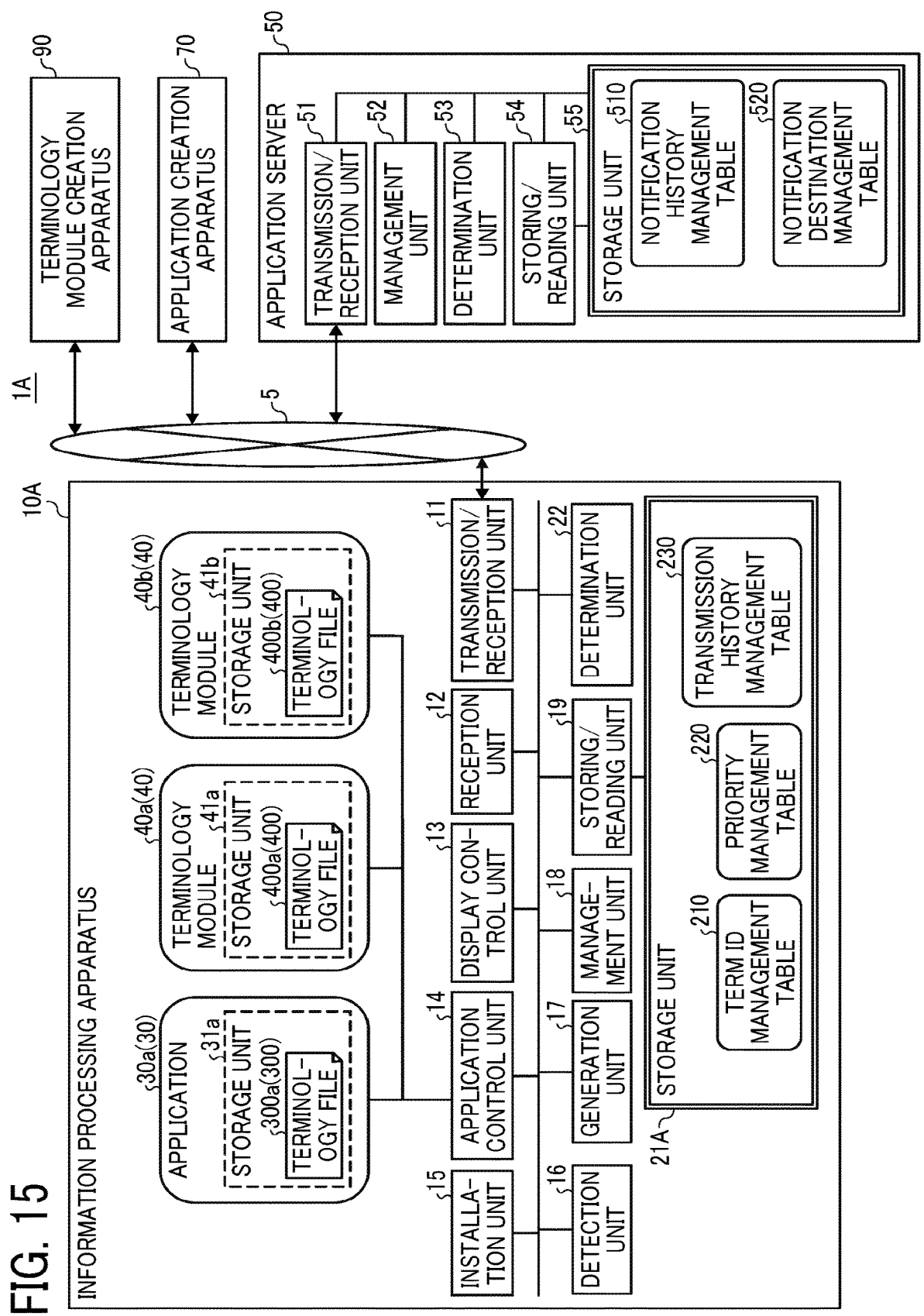
FIG. 15 illustrates an example of a functional block diagram of an information processing system according to a second embodiment.

FIG. 15 illustrates an example of a functional block diagram of the information processing system 1A according to the second embodiment. As illustrated in FIG. 15, the information processing apparatus 10A includes a determination unit 22 in addition to the functional units included in the information processing apparatus 10 described in the first embodiment. The determination unit 22 determines whether or not to transmit the notification information 100, generated by the generation unit 17, to the application server 50. The determination unit 22 is implemented by the program executed by the CPU 101 illustrated in FIG. 2.

Further, the information processing apparatus 10A stores a transmission history management table 230 (FIG. 16) in the storage unit 21A. FIG. 16 illustrates an example of the transmission history management table 230 according to the second embodiment. As illustrated in FIG. 16, the transmission history management table 230 manages the transmission history of the notification information 100, which has been transmitted from the information processing apparatus 10A to the application server 50. The transmission history management table 230 stores the transmission history information of the notification information 100, indicating the transmission history of the notification information 100 to the application server 50, in association with each type of the terminology module 40 (terminology module name), each version of the terminology module 40 (terminology module version), each type of the application 30 (application name), and each version of the application 30 (application version).

The transmission history management table 230 manages the transmission history information, which is a transmission history of the notification information 100 to the application server 50, for each combination of the version of the terminology module 40 and the version of the application 30. In an example case in FIG. 16, the transmission history information includes the last transmission date of the notification information 100 and the number of times transmitting the notification information 100 to the application server 50. The information processing apparatus 10A can stop the transmission of the notification information 100 to the application server 50 for a given period of time after the notification information 100 was transmitted at the last time (most recently) based on the last transmission date included in the transmission history management table 230. Further, the information processing apparatus 10A can prevent transmitting the same notification information (the notification information 100 having the same notification information) to the application server 50 for a given number of times or more based on the number of times transmitting the notification information 100.

Figure 17:
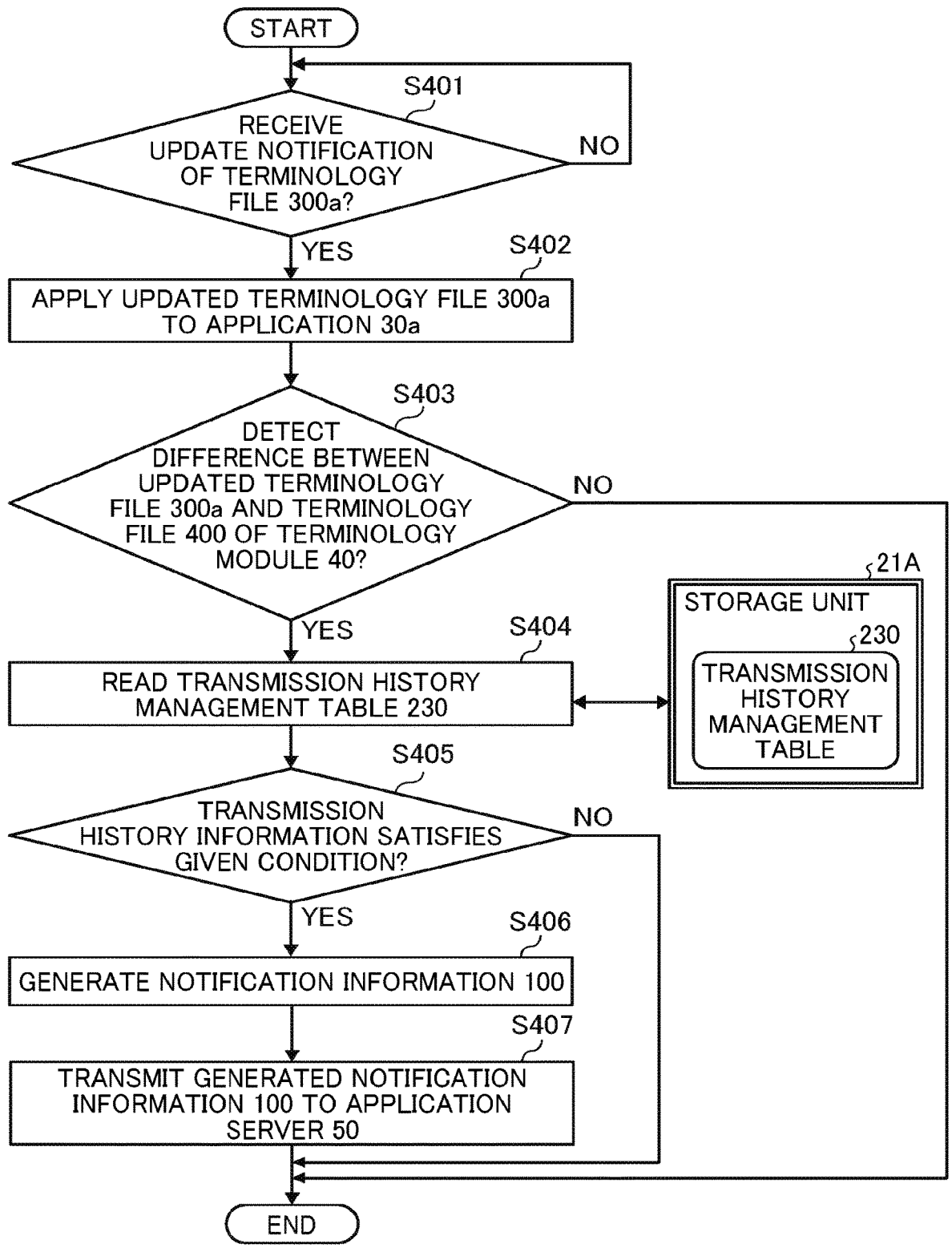
FIG. 17 is an example of a flowchart illustrating the steps of a process of generating notification information in an information processing apparatus according to the second embodiment.

FIG. 17 is an example of a flowchart illustrating the steps of a process of generating the notification information in the information processing apparatus 10A according to the second embodiment.

In step S401, if the application control unit 14 receives an update notification of the terminology file 300a via the transmission/reception unit 11 (S401: YES), the application control unit 14 proceeds the sequence to step S402. On the other hand, if the application control unit 14 has not yet received the update notification of the terminology file 300a via the transmission/reception unit 11 (S401: NO), the application control unit 401 repeats step S401.

In step S402, the application control unit 14 applies the updated terminology file 300a to the application 30a.

In step S403, if the detection unit 16 detects the difference between the updated terminology file 300a and the terminology file 400 of the terminology module 40 (S403: YES), the detection unit 16 proceeds the sequence to step S404. On the other hand, if the detection unit 16 does not detect the difference (S403: NO), the detection unit 16 ends the sequence. The processing performed by the detection unit 16 in step S403 is similar to the processing performed in step S203 illustrated in FIG. 11.

In step S404, the determination unit 22 (FIG. 15) reads out the transmission history management table 230 stored in the storage unit 21A. Specifically, the determination unit 22 outputs a read request of the transmission history management table 230 to the storing/reading unit 19. When the storing/reading unit 19 detects the read request, the storing/reading unit 19 reads out the transmission history management table 230 stored in the storage unit 21A. Then, the storing/reading unit 19 outputs the read transmission history management table 230 to the determination unit 22.

In step S405, if the transmission history information included in the read transmission history management table 230 satisfies a given condition (S405: YES), the determination unit 22 proceeds the sequence to step S406. On the other hand, if the transmission history information included in the transmission history management table 230 does not satisfy the given condition (S405: NO), the determination unit 22 ends the sequence.

The given condition can be set by a user of the information processing apparatus 10A appropriately. For example, the determination unit 22 can determine that the transmission history information included in the read transmission history management table 230 satisfies the given condition if a given period of time has passed or elapsed from the date when the notification information 100 of the same contents was last (most recently) transmitted to the application server 50. Further, the determination unit 22 can determine that the transmission history information included in the read transmission history management table 230 satisfies the given condition if the notification information 100 having the same contents has never been transmitted to the application server 50. Further, the determination unit 22 can determine that the transmission history information included in the read transmission history management table 230 satisfies the given condition if the number of times transmitting the notification information 100 having the same contents to the application server 50 is equal to or less than a given number of times.

In step S406, the generation unit 17 generates the notification information 100 based on data corresponding to the difference detected by the detection unit 16.

In step S407, the transmission/reception unit 11 transmits the notification information 100 generated by the generation unit 17 to the application server 50. Further, in addition to or instead of the processing performed by the determination unit 22 described above, the information processing apparatus 10A can be configured to set whether or not to transmit the notification information 100 to the application server 50 based on a user input received by the reception unit 12.

As above described, in the information processing system 1A according to the second embodiment, the transmission history management table 230 is used to determine whether or not to transmit the notification information 100 from the information processing apparatus 10A to the application server 50. Therefore, in the information processing system 1A according to the second embodiment, if a user does not want to notify the notification information 100 to the terminology module creation apparatus 90, the notification function of the information processing apparatus 10A can be turned off, with which the usability of user can be improved.

Third Embodiment

Hereinafter, a description is given of an information processing system 1B according to a third embodiment. In the third embodiment, the same configuration and functions as those of the first embodiment or the second embodiment are denoted by the same reference numerals, and the description thereof will be omitted. Similar to the second embodiment, in the information processing system 1B according to the third embodiment, an information processing apparatus 10B stores the transmission history management table 230 indicating the transmission history of the notification information 100 to the application server 50 in the storage unit 21B. If updating of the terminology module 40 is not performed for a given period of time, the information processing apparatus 10B requests a translation server 60, used as an external server, to translate the one or more terms.

Figure 18:
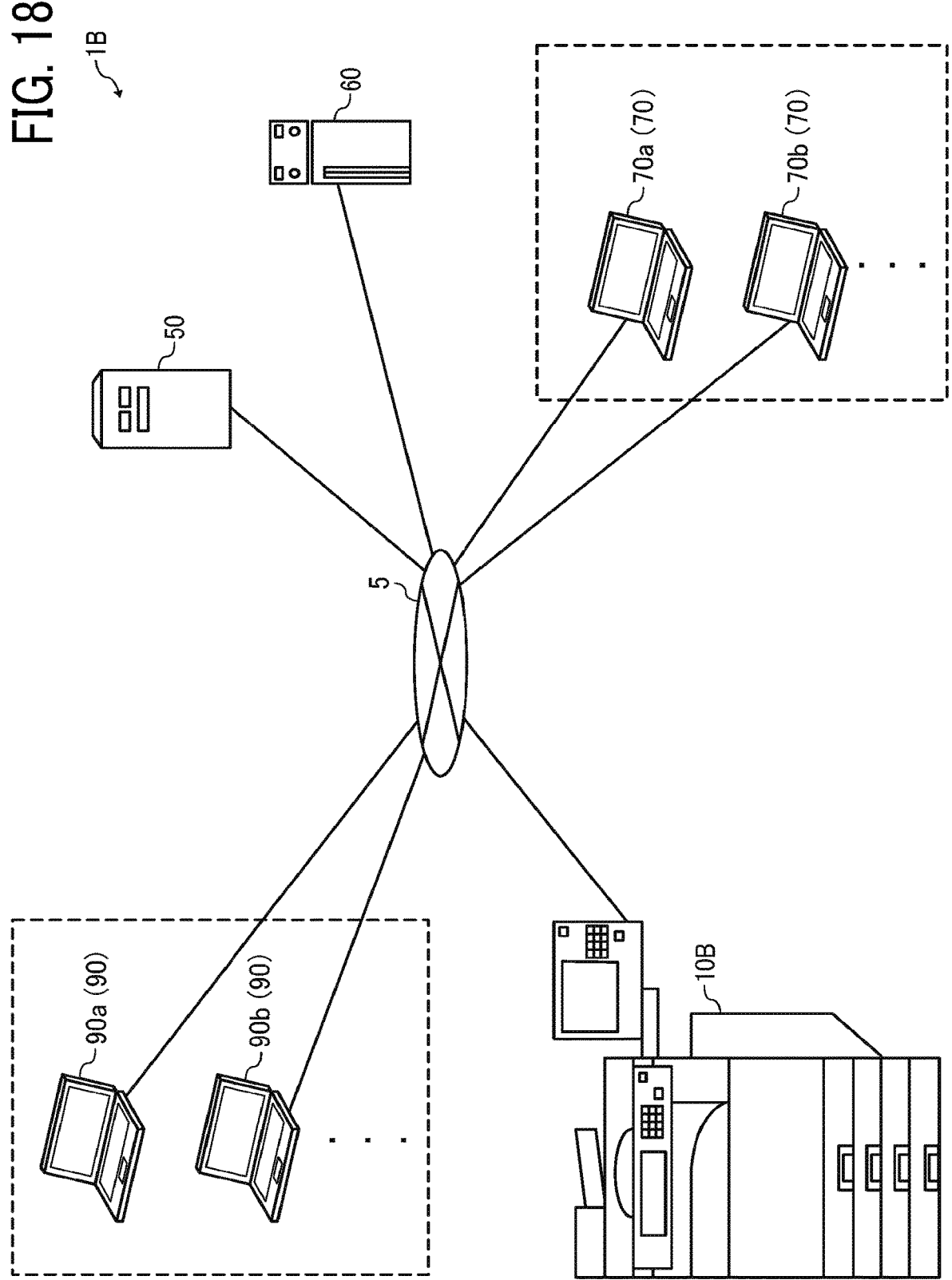
FIG. 18 illustrates an example of a system configuration of an information processing system according to a third embodiment.

FIG. 18 illustrates an example of a system configuration of the information processing system 1B according to the third embodiment. The information processing system 1B illustrated in FIG. 18 includes a translation server 60 in addition to the configuration of the information processing system 1 described in the first embodiment. The translation server 60 is connected to the information processing apparatus 10B via the communication network 5. The translation server 60 receives a translation request from the information processing apparatus 10B, and then transmits a translation result to the information processing apparatus 10B.

If the information processing apparatus 10B transmits the notification information 100 to the terminology module creation apparatus 90 but the terminology module creation apparatus 90 does not update the terminology module 40, the information processing apparatus 10B cannot update the terminology module 40 installed on the information processing apparatus 10. To cope with this situation, if a given period of time has elapsed without updating the terminology module 40 after the information processing apparatus 10B transmits the notification information 100, the information processing apparatus 10B uses the translation server 60 to update the terminology module 40.

Figure 19:
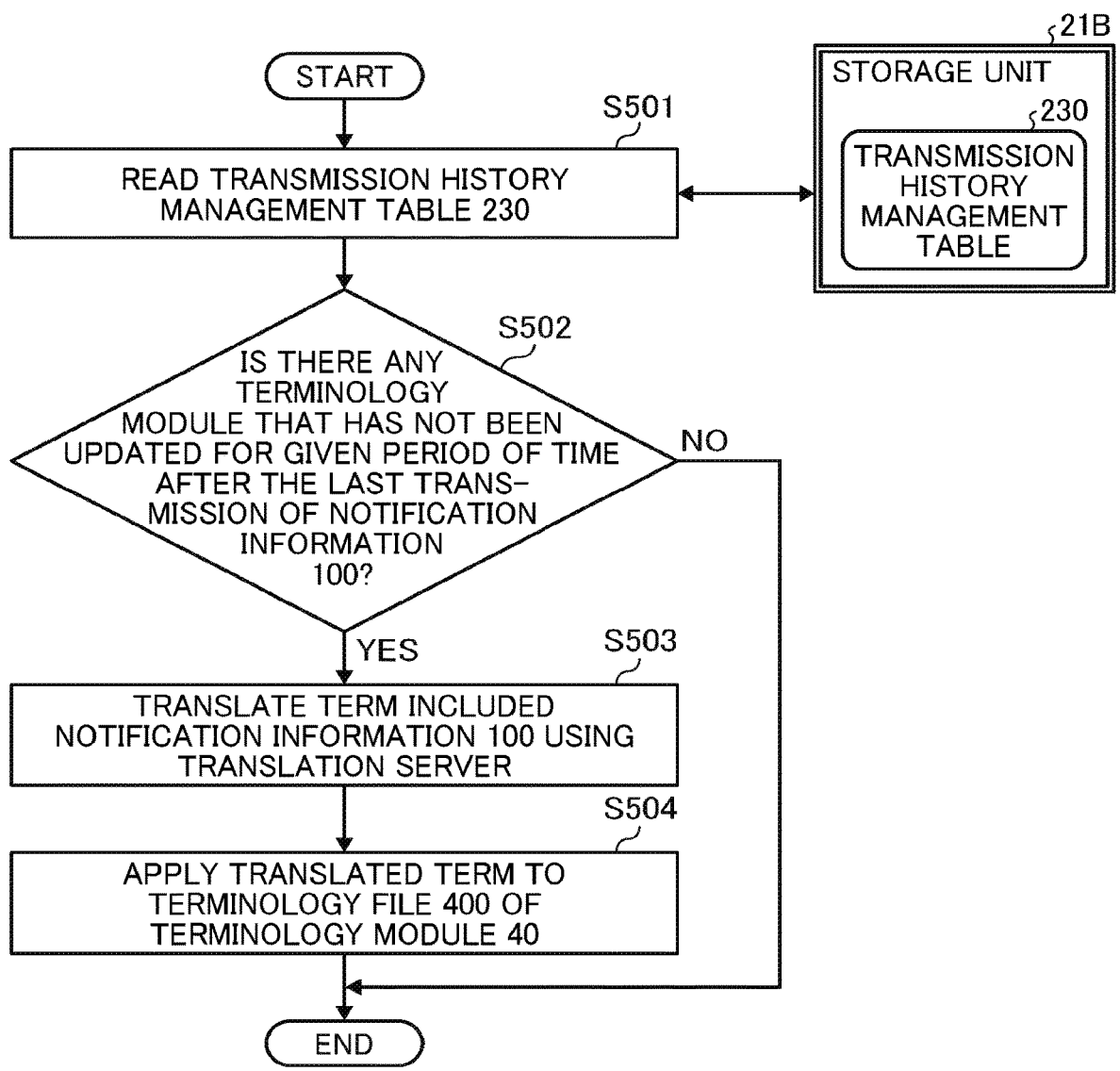
FIG. 19 is an example of a flowchart illustrating the steps of a process of updating a terminology module in an information processing apparatus according to the third embodiment.

FIG. 19 is an example of a flowchart illustrating the steps of a process of updating the terminology module 40 in the information processing apparatus 10B according to the third embodiment. In FIG. 19, it is assumed that the information processing apparatus 10B has already transmitted the notification information 100 to the application server 50.

In step S501, the determination unit 22 (FIG. 15) reads out the transmission history management table 230 stored in the storage unit 21B. Specifically, the determination unit 22 outputs a read request of the transmission history management table 230 to the storing/reading unit 19. When the storing/reading unit 19 detects the read request, the storing/reading unit 19 reads out the transmission history management table 230 stored in the storage unit 21B. Then, the storing/reading unit 19 outputs the read transmission history management table 230 to the determination unit 22.

In step S502, the determination unit 22 determines whether any of the terminology module 40 that has not been updated for a given period of time exists based on the last transmission date included in the transmission history management table 230. If the terminology module 40 that has not been updated for the given period of time exists (S502: YES), the determination unit 22 proceeds the sequence to step S503. On the other hand, if the terminology module 40, which has not been updated for the given period of time, does not exist (S502: NO), the determination unit 22 ends the sequence.

In step S503, the information processing apparatus 10 uses the translation server 60 to translate a character string of term included in the notification information 100. Specifically, the transmission/reception unit 11 transmits the character string of term described in the difference file included in the notification information 100 to the translation server 60. Then, the translation server 60 translates the received character string of term, and then the transmission/reception unit 11 receives the translated character string of term from the translation server 60.

In step S504, the application control unit 14 applies the translated character string of term to the terminology file 400 of the corresponding terminology module 40 to update the terminology file 400 of the terminology module 40. Then, the management unit 18 adds the term identification information of the terminology module 40, corresponding to the term ID of the translated term, to the term ID management table 210 stored in the storage unit 21B.

In the above described information processing system 1B according to the third embodiment, if the updating of the terminology module 40 is not performed for the given period of time in the information processing apparatus 10B, the translation server 60 is used to translate the terminology module 40. Therefore, in the information processing system 1B according to the third embodiment, even if the terminology module 40 is not updated in the information processing apparatus 10B for the given period of time, the terminology module 40 can be updated after updating the application 30 using the translation server 60.

Fourth Embodiment

Hereinafter, a description is given of an information processing system 1C according to a fourth embodiment. The same configuration and functions as those of the first embodiment to the third embodiment are denoted by the same reference numerals, and the description thereof will be omitted. In the information processing system 1C according to the fourth embodiment, when the difference of the term included in the terminology file 400 associated with the application 30 is detected by the information processing apparatus 10, an application server 50A transmits the notification information 100 to the terminology module creation apparatus 90, which is the creation source of the terminology module 40, and also transmits the notification information 100 to another terminology module creation apparatus 90.

Figure 20:
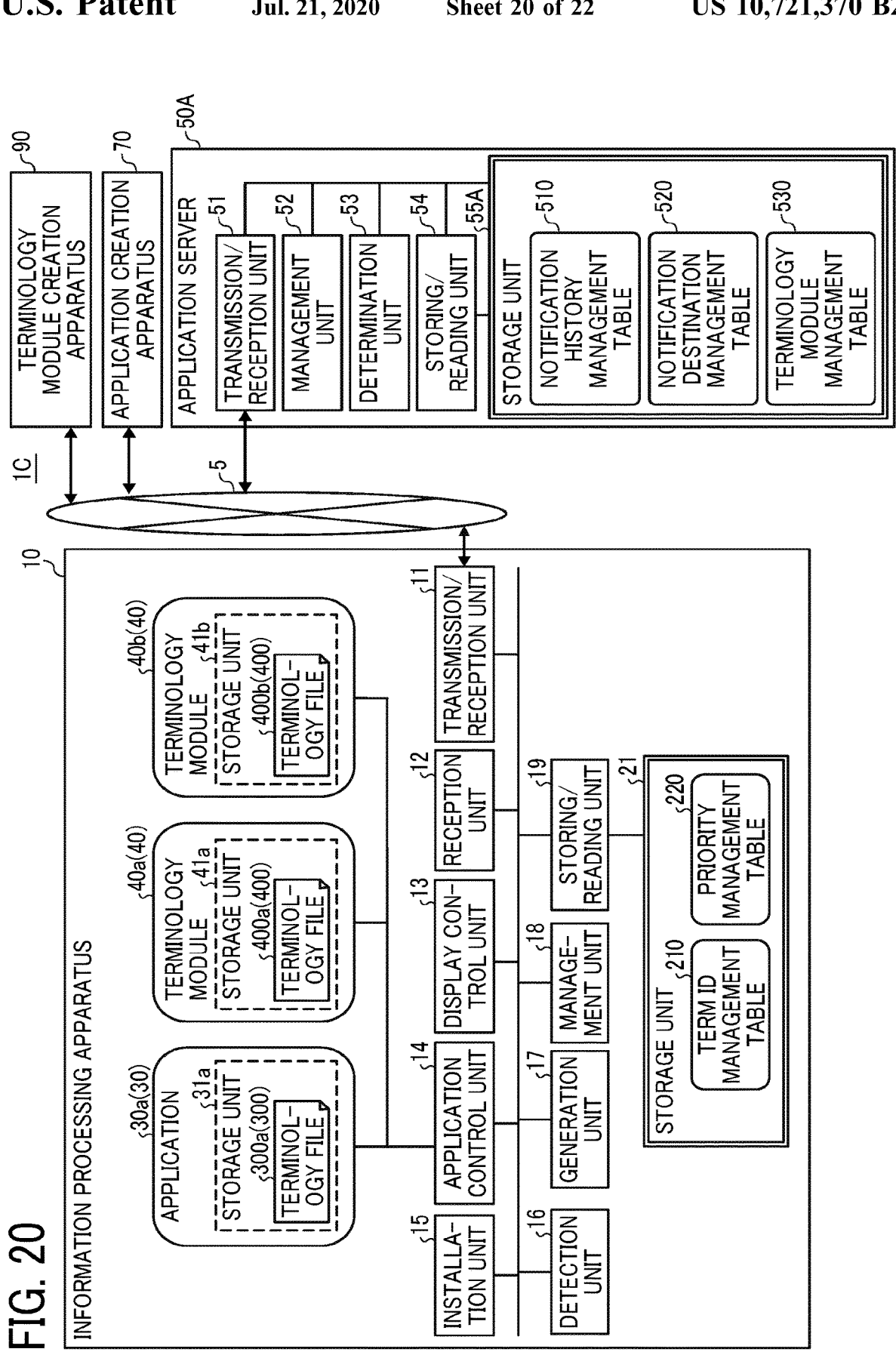
FIG. 20 illustrates an example of a functional block diagram of an information processing system according to a fourth embodiment.

FIG. 20 illustrates an example of the functional block diagram of the information processing system 1C according to the fourth embodiment. As illustrated in FIG. 20, the application server 50A stores a terminology module management table 530 (FIG. 21) in the storage unit 55A in addition to the functional units of the application server 50 described in the first embodiment.

FIG. 21 illustrates an example of the terminology module management table 530 according to the fourth embodiment. As illustrated in FIG. 21, the terminology module management table 530 stores the type of terminology module 40 (terminology module name) and the version of the terminology module 40 (terminology module version) in association with the type of another module (related module name) related to the type of terminology module 40.

For example, in the terminology module management table 530 in FIG. 21, the terminology module 40a of version 1.0 is associated with the terminology module 40b. Further, the terminology module 40a of version 1.1 is associated with the terminology module 40b and the terminology module 40c. Further, the terminology module 40b of version 1.0 is associated with the terminology module 40c.

The related module name included in the terminology module management table 530 can be set, and modified or changed by an administrator of the application server 50 appropriately.

Figure 22:
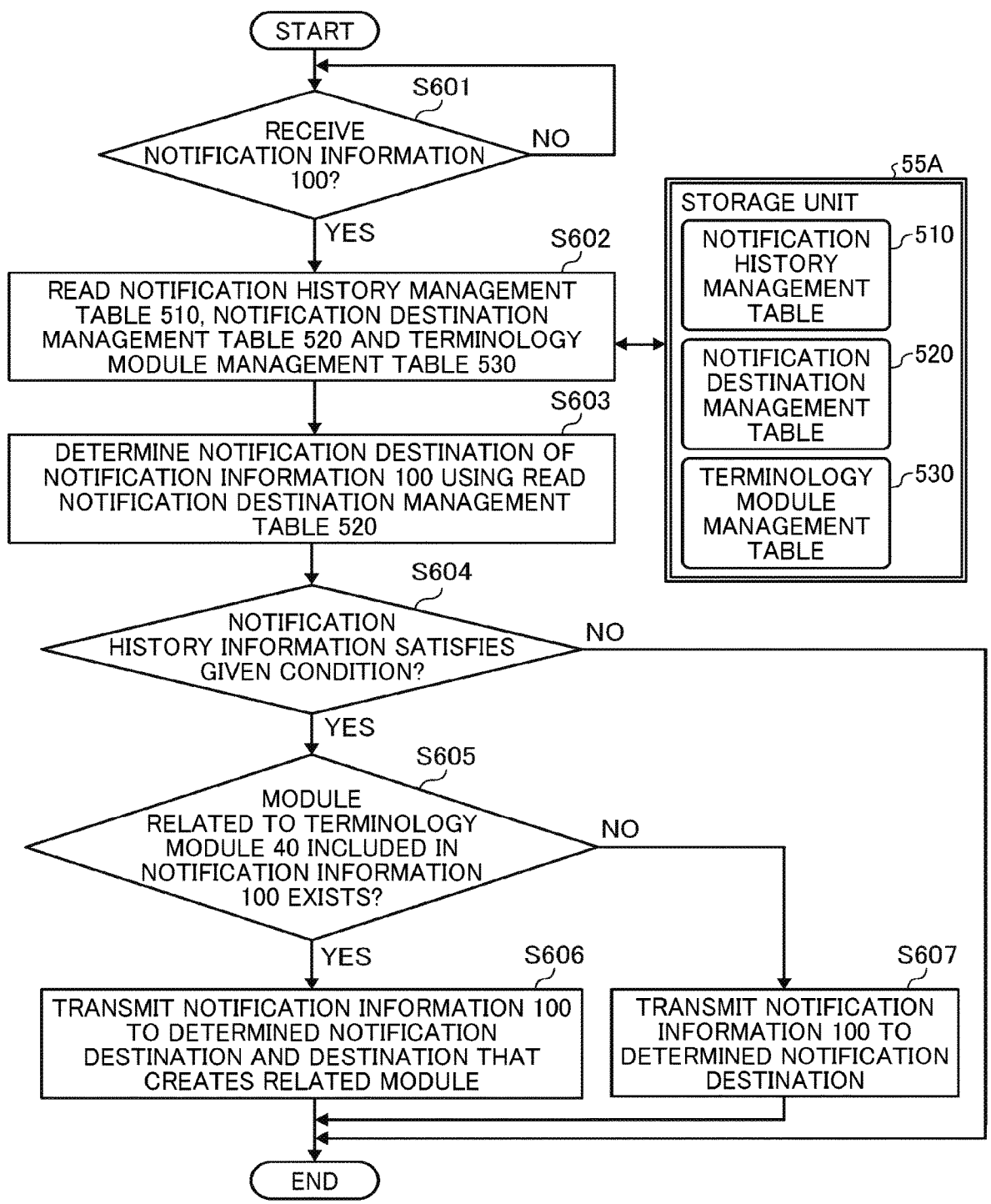
FIG. 22 is an example of a flowchart illustrating the steps of a process of determining a notification destination related to an application server according to the fourth embodiment.

FIG. 22 is an example of a flowchart illustrating the steps of a process of determining a notification destination related to the application server 50A according to the fourth embodiment.

In step S601, if the transmission/reception unit 51 of the application server 50A receives the notification information 100 transmitted from the information processing apparatus 10 (S601: YES), the transmission/reception unit 51 proceeds the sequence to step S602. On the other hand, if the transmission/reception unit 51 has not yet received the notification information 100 (S601: NO), the transmission/reception unit 51 repeats step S601.

In step S602, the determination unit 53 reads out the notification history management table 510, the notification destination management table 520, and the terminology module management table 530 from the storage unit 55A. Specifically, the determination unit 53 outputs a read request of the notification history management table 510, the notification destination management table 520, and the terminology module management table 530 to the storing/reading unit 54. When the storing/reading unit 54 detects the read request, the storing/reading unit 54 reads out the notification history management table 510, the notification destination management table 520, and the terminology module management table 530 stored in the storage unit 55A. Then, the storing/reading unit 54 outputs the read notification history management table 510, notification destination management table 520, and terminology module management table 530 to the determination unit 53.

In step S603, the determination unit 53 determines a notification destination of the notification information 100 using the read notification destination management table 520. Specifically, the determination unit 53 identifies the address information associated with the information of the terminology module 40, included in the notification information 100 received via the transmission/reception unit 51, in the notification destination management table 520, as the notification destination. For example, if the notification information 100 illustrated in FIG. 13 is received by the transmission/reception unit 51, the determination unit 53 determines the address information of "xxx@aaa.co.jp" associated with the version "1.0" of the "terminology module 40a" set in the notification destination management table 520 illustrated in FIG. 9 as the notification destination.

In step S604, if the notification history information included in the read notification history management table 510 satisfies a given condition (S604: YES), the determination unit 53 proceeds the sequence to step S605. On the other hand, if the notification history information does not satisfy the given condition (S604: NO), the determination unit 53 ends the sequence.

The given condition can be set by an administrator of the application server 50 appropriately. For example, the determination unit 53 can determine that the notification history information included in the read notification history management table 510 satisfies the given condition if a given period of time has elapsed from the date when the notification information 100 was notified at the last time (most recently). Further, the determination unit 53 can determine that the notification history information included in the read notification history management table 510 satisfies the given condition if the notification destination 100 has never been notified to the determined notification destination. Further, the determination unit 53 can determine that the notification history information included in the read notification history management table 510 satisfies the given condition if the number of times notifying the notification information 100 is equal to or less than a given number of times. As above described, the determination unit 53 of the application server 50 determines whether or not to transmit the notification information 100 to the terminology module creation apparatus 90, which is determined as the notification destination, based on the notification history information included in the notification history management table 510.

In step S605, if the determination unit 53 determines that a module related to the terminology module 40 included in the notification information 100 exists in the read terminology module management table 530 (S605: YES), the determination unit 53 proceeds the sequence to step S606.

In step S606, the transmission/reception unit 11 transmits the notification information 100 to the terminology module creation apparatus 90 (one creation apparatus of terminology module), which is the determined notification destination, and also to another terminology module creation apparatus 90 (another creation apparatus of terminology module) that has created the related module. The address of another terminology module creation apparatus 90 that has created the related module is determined using the read notification destination management table 520.

On the other hand, if the module related to the terminology module included in the notification information 100 does not exist in the read terminology module management table 530 (S605: NO), the determination unit 53 proceeds the sequence to step S607.

In step S607, the transmission/reception unit 51 transmits the notification information 100 to the terminology module creation apparatus 90, which is the determined notification destination. Further, for example, the application server 50 can be configured to transmit the notification information 100 not only to the related module, set in the terminology module management table 530, but also to one or more modules registered with the address information in the notification destination management table 520.

In the above described information processing system 1C according to the fourth embodiment, when the difference of the term included in the terminology file 300 associated with the application 30 and the term included in the terminology file 400 associated with the terminology module 40 is detected in the information processing apparatus 10, the notification information 100 is transmitted to the terminology module creation apparatus 90, which is the creation source of the terminology module 40, and also transmitted to another terminology module creation apparatus 90. Therefore, in the information processing system 1C according to the fourth embodiment, another terminology module creation apparatus 90 can create the terminology module 40 based on the updated contents of the terminology module creation apparatus 90.

As to the above described embodiments, the information processing apparatus 10 (10A) includes the application 30 (an example of application) and the terminology module 40 (an example of module) related to the operation of the application 30. The information processing apparatus 10 (10A) detects the difference between a term (an example of first character string) included in the terminology file 300 (an example of first file) associated with the application 30 and a term (an example of second character string) included in the terminology file 400 (an example of second file) associated with the terminology module 40, corresponding to the term included in the terminology file 300, and transmits the notification information 100 (an example of difference information) indicating the detected difference to the application server 50 (50A) (an example of external apparatus). Then, the information processing apparatus 10 (10A) updates the terminology file 400 in response to the update notification received from the application server 50 (50A). Therefore, when the application 30 is updated, following the updating of the application 30, the information processing apparatus 10 (10A) can update the terminology module 40 related to the operation of the updated application 30.

Further, the information processing apparatus 10 (10A) according to the above described embodiments includes the application control unit 14 (an example of application update unit) for updating the application 30, and detects the difference between the updated terminology file 300 (an example of first file) and the terminology file 400 (an example of second file). Therefore, when the application 30 is updated, following the updating of given application 30, the information processing apparatus 10 (10A) can update the module related to the operation of the updated application 30.

Further, as to the information processing system 1 (1A, 1B, 1C) according to the above described embodiments, the information processing system includes the information processing apparatus 10 (10A), the application server 50 (50A) (an example of external apparatus) that communicates with the information processing apparatus 10 (10A) via the communication network 5. The application server 50 (50A) includes the determination unit 53 (an example of determination unit) and the transmission/reception unit 51 (an example of second transmission unit). The determination unit 53 determines whether the notification information 100 received from the information processing apparatus 10 (10A) is to be transmitted to the terminology module creation apparatus 90 (an example of creation apparatus), which has created the terminology module 40 (an example of module), based on the transmission history information indicating the transmission history of the notification information 100 (an example of difference information). The transmission/reception unit 51 transmits the notification information 100 to the terminology module creation apparatus 90 if the determination unit 53 determines to transmit the notification information 100. Therefore, as to the information processing system 1 (1A, 1B, 1C) according to the above described embodiments, based on the notification information 100 including the data corresponding to the difference with respect to the updated application 30, a modification portion of the terminology module 40 can be specified or identified, and the time period required for updating the terminology module 40 can be shortened.

In the information processing system 1 (1A, 1b, 1C) according to the above described embodiments, the transmission history information includes date information indicating a date when the notification information 100 (an example of difference information) was last transmitted to the terminology module creation apparatus 90 (an example of creation apparatus). If the current time has passed or elapsed from the date included in the date information for given period of time or more, it is determined that the notification information 100 is to be transmitted to an external apparatus, such as the application server 50 (50A). Therefore, as to the information processing system 1 (1A, 1b, 1C) according to the above described embodiments, the frequency of transmitting the notification information 100 (i.e., the number of transmitting the notification information 100) to the terminology module creation apparatus 90 can be adjusted or regulated.

Further, the method of updating a file according to the above described embodiments is performed by the information processing apparatus 10 (10A) including the application 30 (an example of application) and the terminology module 40 (an example of module) associated with the operation of the application 30. The information processing apparatus 10 (10A) detects a difference between a term (an example of first character string) included in the terminology file 300 (an example of first file) associated with the application 30 and a term (an example of second character string) included in the terminology file 400 (an example of second file) associated with the terminology module 40, corresponding to the term included in the terminology file 300, and transmits the notification information 100 (an example of difference information) indicating the detected difference to the application server 50 (50A) (an example of external apparatus). Then, the information processing apparatus 10 (10A) updates the terminology file 400 in response to an update notification received from the application server 50. Therefore, when the application 30 is updated, following the updating of given application 30, the information processing apparatus 10 (10A) can update the module related to the operation of the updated application 30.

Conventionally, a technique for updating an application installed on an information processing apparatus (terminal apparatus) when the contents of the application are updated by an application distribution source (external apparatus) is known. For example, in one technology, when a file stored in an update notification server is updated, information related to the updating is notified to the information processing apparatus (terminal apparatus).

If an application installed on the information processing apparatus is same as the application updated by the external apparatus, the application installed on the information processing apparatus can be updated, but a module related to an operation of the application, such as a terminology module included in the information processing apparatus, may not be updated in conventional environment.

As to above described embodiments, the information processing apparatus includes an application and a module related to an operation of the application, in which when the application is updated, the module related to the operation of the updated application can be updated after updating the application.

It should be noted that the functions of each of the above described embodiments can be implemented by computer-executable programs described in legacy programming languages or object-oriented programming languages such as assembler, C, C++, C #, Java (registered trademark), and the programs for performing the functions of each embodiment can be distributed through electronic communication line.

Further, the programs for performing the functions of each embodiment can also be stored in a computer-readable recording medium such as ROM, electrically erasable programmable read-only memory (EEPROM), erasable programmable read-only memory (EPROM), flash memory, flexible disk, compact disc (CD)-ROM, CD-re-writable (RW), digital versatile disk (DVD)-ROM, DVD-RAM, DVD-RW, Blu-Ray disc, secure digital (SD) card, magneto-optical disc (MO), and the like.

Further, some or all of the functions of each embodiment can be implemented on a programmable device (PD) such as field programmable gate array (FPGA), or can be implemented as application specific integrated circuit (ASIC), and data to implement the functions of each embodiment on the PD can be distributed by a recording medium, in which the data includes circuit configuration data (bit stream data) downloadable to the PD to implement the functions of the embodiments on the PD, and the data is described using hardware description language (HDL), very-high speed integrated circuits hardware description language (VHDL) and Verilog HDL.

Although the information processing apparatus, the information processing system, the method of updating file, and the program according to embodiments of the present invention have been described, the present invention is not limited to the above embodiments, but can be modified within a scope of the present invention, such as adding other embodiments, changing or deleting embodiments of the present invention within the scope of the present invention insofar as it is possible to achieve the effects of any of the embodiments of the present invention.

Numerous additional modifications and variations are possible in light of the above teachings. It is therefore to be understood that, within the scope of the appended claims, the disclosure of this patent specification can be practiced otherwise than as specifically described herein. Any one of the above-described operations may be performed in various other ways, for example, in an order different from the one described above.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An information processing apparatus comprising:
a memory that stores an application and a module related to an operation of the application; and
circuitry configured to:
    detect a difference between a first character string included in a first file associated with the application and a second character string included in a second file associated with the module as difference information, the second character string corresponding to the first character string;
    transmit the difference information indicating the detected difference to a server, wherein the server determines whether to transmit the difference information received from the information processing apparatus to another server that has created the module based on transmission history information indicating a transmission history of the difference information, and transmits the difference information to the another server in response to a determination to transmit the difference information to the another server; and
    update the second file in accordance with an update notification of the second file transmitted from the server.

2. The information processing apparatus according to claim 1,
wherein the circuitry updates the first file associated with the application, and detects a difference between the updated first file and the second file.

3. The information processing apparatus according to claim 1,
wherein the transmission history information includes date information indicating a date when the difference information was transmitted to the another server most recently,
wherein the server determines to transmit the difference information to the another server when a current time has elapsed from the date indicated by the date information included in the transmission history information for a given period of time or more.

4. An information processing system comprising:
an information processing apparatus installed with an application and a module related to an operation of the application; and
a server that communicates with the information processing apparatus via a network,
wherein the information processing apparatus includes circuitry configured to
detect a difference between a first character string included in a first file associated with the application and a second character string included in a second file associated with the module as difference information, the second character string corresponding to the first character string;
transmit the difference information indicating the detected difference to the server; and update the second file in accordance with an update notification of the second file transmitted from the server, wherein the server includes another circuitry configured to receive the difference information from the information processing apparatus;

determine whether to transmit the difference information received from the information processing apparatus to another server that has created the module based on transmission history information indicating a transmission history of the difference information; and transmit the difference information to the another server in response to a determination to transmit the difference information to the another server.

5. The information processing system according to claim 4, wherein the transmission history information includes date information indicating a date when the difference information was transmitted to the another server most recently, wherein the another circuitry of the server determines to transmit the difference information to the another server when a current time has elapsed from the date indicated by the date information included in the transmission history information for a given period of time or more.

6. A method of updating a file for an information processing apparatus installed with an application and a module related to an operation of the application, the method comprising:

detecting a difference between a first character string included in a first file associated with the application and a second character string included in a second file associated with the module as difference information, the second character string corresponding to the first character string;

transmitting the difference information indicating the detected difference to a server, wherein the server determines whether to transmit the difference information received from the information processing apparatus to another server that has created the module based on transmission history information indicating a transmission history of the difference information, and transmits the difference information to the another server in response to a determination to transmit the difference information to the another server; and updating the second file in accordance with an update notification of the second file transmitted from the server.

7. The method according to claim 6, wherein the transmission history information includes date information indicating a date when the difference information was transmitted to the another server most recently, and the server determines to transmit the difference information to the another server when a current time has elapsed from the date indicated by the date information included in the transmission history information for a given period of time or more.

* * * * *